US012317297B2

(12) United States Patent
Bhamri et al.

(10) Patent No.: US 12,317,297 B2
(45) Date of Patent: May 27, 2025

(54) ARTIFICIAL INTELLIGENCE CAPABILITY REPORTING FOR WIRELESS COMMUNICATION

(71) Applicant: Lenovo (Singapore) Pte. Ltd., Singapore (SG)

(72) Inventors: Ankit Bhamri, Bad Nauheim (DE); Ahmed Hindy, Aurora, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 248 days.

(21) Appl. No.: 17/535,524

(22) Filed: Nov. 24, 2021

(65) Prior Publication Data

US 2023/0164817 A1 May 25, 2023

(51) Int. Cl.
*H04W 72/51* (2023.01)
*H04W 8/22* (2009.01)
*H04W 48/14* (2009.01)
*H04W 48/16* (2009.01)

(52) U.S. Cl.
CPC ............ *H04W 72/51* (2023.01); *H04W 8/22* (2013.01); *H04W 48/14* (2013.01); *H04W 48/16* (2013.01)

(58) Field of Classification Search
None
See application file for complete search history.

(56) References Cited

U.S. PATENT DOCUMENTS

| 11,082,115 | B2 | 8/2021 | Landis et al. | |
| 2020/0404069 | A1* | 12/2020 | Li | H04L 67/59 |
| 2021/0160149 | A1* | 5/2021 | Ma | H04W 24/02 |
| 2022/0038349 | A1* | 2/2022 | Li | G06N 3/08 |
| 2022/0132572 | A1* | 4/2022 | Fang | H04W 74/0808 |
| 2022/0338189 | A1* | 10/2022 | Madadi | H04B 7/0632 |
| 2022/0360973 | A1* | 11/2022 | Zhu | G06N 20/00 |

(Continued)

FOREIGN PATENT DOCUMENTS

| WO | WO-2018063456 A1 * | 4/2018 | ........... H04W 76/16 |
| WO | 2021086308 A1 | 5/2021 | |

(Continued)

OTHER PUBLICATIONS

"Radio Resource Control (RRC) protocol specification", 3rd Generation Partnership Project; Technical Specification Group Radio Access Network, 3GPP TS 38.331 V16.6.0, 3GPP Organizational Partners, Valbonne, France [retrieved Feb. 2, 2022]. Retrieved from the Internet <http://www.3gpp.org>., Sep. 2021, 961 Pages.

(Continued)

*Primary Examiner* — Hong S Cho
(74) *Attorney, Agent, or Firm* — FIG. 1 Patents

(57) ABSTRACT

Various aspects of the present disclosure relate to reporting of AI capabilities between network nodes, such as between a user equipment (UE) and a base station. A UE, for instance, generates a capability report that specifies whether the UE supports AI-enabled functionality and/or specific supported and non-supported AI-enabled features. The UE communicates the capability report to a base station and supported AI features can be implemented in conjunction with wireless communication between the UE and the base station, such as by the UE, by the base station, and/or cooperatively between the UE and the base station.

20 Claims, 18 Drawing Sheets

(56) References Cited

U.S. PATENT DOCUMENTS

2022/0376957 A1* 11/2022 Song .................. H04L 25/0254
2023/0112099 A1*  4/2023 Lei ...................... H04L 1/1819
                                                          370/329
2023/0284139 A1*  9/2023 Ma .................... H04W 28/0205
                                                          370/329

FOREIGN PATENT DOCUMENTS

WO    WO-2022082356 A1 *  4/2022
WO    WO-2022235525 A1 * 11/2022  ............. G06N 20/00

OTHER PUBLICATIONS

PCT/US2022/050850, "International Search Report and Written Opinion", PCT Application No. PCT/US2022/050850, Feb. 20, 2023, 18 pages.
Zte, et al., "Consideration on Rel-18 SL Relay and Mesh", 3GPP TSG RAN Meeting #93-e, RP-212393, Electronic Meeting, Agenda: 9.0.3 [retrieved May 3, 2023]. Retrieved from the Internet <, Sep. 2021, 7 pages.
PCT/US2022/050850, "International Preliminary Report on Patentability", International Application No. PCT/US2022/050850, Jun. 6, 2024, 14 pages.

* cited by examiner

```
-- ASN1START
-- TAG-AI-Capability-START

AI-SUPPORTED ::= ENUMERATED {supported, notSupported}

-- TAG-AI-Capability--STOP
-- ASN1STOP
```

FIG. 2

```
-- ASN1START
-- TAG-PHY-PARAMETERS-START

Phy-Parameters ::=            SEQUENCE {

........................................
    ........................................
    ........................................
    phy-AI-capability ENUMERATED {supported,notSupported } OPTIONAL,
    ........................................
    ........................................
    ........................................
```

FIG. 3

```
-- ASN1START
-- TAG-AI-Framework-Capability-START

AI-Framework-Cap           SEQUENCE {
      convolutionalNeuralNetwork   ENUMERATED {supported, notSupported},
      recurrentNeuralNetwork       ENUMERATED {supported, notSupported},
      modularNeuralNetwork         ENUMERATED {supported, notSupported}
      AIFramework[other]           ENUMERATED {supported, notSupported}
   }
-- TAG-AI-Framework-Capability--STOP
-- ASN1STOP
```

FIG. 4

```
-- ASN1START
-- TAG-AI-Learning-Capability-START

AI-Learning-Cap            SEQUENCE {
    UnsupervisedLearning   ENUMERATED {supported, notSupported},
    SupervisedLearning     ENUMERATED {supported, notSupported},
    FederatedLearning      ENUMERATED {supported, notSupported},
    ReinforcedLearning     ENUMERATED {supported, notSupported}
    Learning[other]        ENUMERATED {supported, notSupported}
    }
-- TAG-AI-Learning-Capability--STOP
-- ASN1STOP
```

FIG. 5

```
-- ASN1START
-- TAG-AI-Application-Capability-START

AI-Application-Mode        SEQUENCE {
JointMode                  ENUMERATED {supported, notSupported},
IndividualMode             ENUMERATED {supported, notSupported},
Mode[other]                ENUMERATED {supported, notSupported}
    }
-- TAG-AI-Application-Capability--STOP
-- ASN1STOP
```

FIG. 8

```
-- ASN1START
-- TAG-PHY-PARAMETERS-START

Phy-Parameters ::=         SEQUENCE {

Phy-ParametersCommon ::=   SEQUENCE {

..........................................
    ..........................................
    ..........................................
    CSI-AI-cap      ENUMERATED {supported, notSupported}, OPTIONAL,
    BM-AI-cap       ENUMERATED {supported, notSupported}, OPTIONAL,
    CE-AI-cap       ENUMERATED {supported, notSupported}, OPTIONAL,
    POS-AI-cap      ENUMERATED {supported, notSupported}, OPTIONAL,
    AI-PHY-cap[other] ENUMERATED {supported, notSupported}, OPTIONAL
    ..........................................
    ..........................................
    ..........................................
```

FIG. 9

```
-- ASN1START
-- TAG-AI-Capability-START

........................................
    ........................................
    ........................................

CSI-AI-capability                      SEQUENCE {
    AI-PMIprediction                   ENUMERATED {supported, notSupported},
    AI-RIprediction                    ENUMERATED {supported, notSupported},
    AI-CQIprediction                   ENUMERATED {supported, notSupported},
    AI-Spatial-domainCompression       ENUMERATED {supported, notSupported},
    AI-Frequency-domainCompression     ENUMERATED {supported, notSupported},
    AI-CSI-RScompression               ENUMERATED {supported, notSupported},
    AI-Subfeature[other]               ENUMERATED {supported, notSupported}
    }

........................................
    ........................................
    ........................................

-- TAG-AI-Capability--STOP
-- ASN1STOP
```

1002 points to CSI-AI-capability block; 1000 labels the overall figure.

FIG. 10

```
-- ASN1START
-- TAG-AI-Capability-START

.........................................
    .........................................
    .........................................

1102
    BM-AI-capability                    SEQUENCE {
        AI-BeamPrediction               ENUMERATED {supported, notSupported},
        AI-BlockagePrediction           ENUMERATED {supported, notSupported},
        AI-SSBcompression               ENUMERATED {supported, notSupported},
        AI-CSI-RScompression            ENUMERATED {supported, notSupported},
        AI-ReportingCompression         ENUMERATED {supported, notSupported},
        AI-BeamFailurePrediction        ENUMERATED {supported, notSupported},
        AI-BMfeature[other]             ENUMERATED {supported, notSupported}
    }

.........................................
    .........................................
    .........................................

-- TAG-AI-Capability--STOP
-- ASN1STOP
```

```
-- ASN1START
-- TAG-AI-Capability-START

............................
    ............................
    ............................

1302
    POS-AI-capability              SEQUENCE {
        AI-LoSpos-prediction       ENUMERATED {supported, notSupported},
        AI-NLoSpos-prediction      ENUMERATED {supported, notSupported},
        AI-PRScompression          ENUMERATED {supported, notSupported},
        AI-POSfeature[other]       ENUMERATED {supported, notSupported}
        }

............................
    ............................
    ............................

-- TAG-AI-Capability--STOP
-- ASN1STOP
```

ARTIFICIAL INTELLIGENCE CAPABILITY REPORTING FOR WIRELESS COMMUNICATION

TECHNICAL FIELD

The present disclosure relates to wireless communications, and more specifically to artificial intelligence (AI) and wireless communication.

BACKGROUND

A wireless communications system may include one or multiple network communication devices, such as base stations, which may be otherwise known as an eNodeB (eNB), a next-generation NodeB (gNB), or other suitable terminology. Each network communication device, such as a base station, may support wireless communications for one or multiple user communication devices, which may be otherwise known as user equipment (UE), or other suitable terminology. The wireless communications system may support wireless communications with one or multiple user communication devices by utilizing resources of the wireless communication system, such as time resources (e.g., symbols, subslots, slots, subframes, frames, or the like) or frequency resources (e.g., subcarriers, carriers). Additionally, the wireless communications system may support wireless communications across various radio access technologies including third generation (3G) radio access technology, fourth generation (4G) radio access technology, fifth generation (5G) radio access technology, and other suitable radio access technologies beyond 5G.

To enable wireless connectivity of a UE to a wireless network, wireless capability information is exchanged between the UE and a base station of the wireless network. Examples of capability information include supported radio access technologies, supported encryption type(s), supported wireless band combinations, and so forth. This enables a wireless connection between a UE and a wireless network to be established that conforms to capabilities of the UE and a base station of the wireless network.

SUMMARY

The present disclosure relates to methods, apparatuses, and systems that support integration and implementations of AI capability reporting for wireless communication. For instance, the present disclosure provides a framework for reporting AI capability information exchange such as between a user equipment (UE) and a wireless network, e.g., a base station. For instance, the UE and the wireless network exchange AI capability information that describes AI features supported and/or not supported by the UE and/or the wireless network, and the UE and/or the wireless network implement one or more of the supported AI features in conjunction with establishing and/or participating in wireless connectivity between the UE and the wireless network. This enables the UE and/or the wireless network to utilize supported AI features for wireless communication and to avoid attempting to proceed with AI-enabled features and corresponding signaling that are not supported by UE and/or the base station. For instance, by avoiding attempting to proceed with unsupported AI-enabled features and corresponding signaling, this avoids wasting time, power, and/or computational resources corresponding to AI-enabled features that cannot be supported by the UE and/or the base station.

Accordingly, by exchanging capability information describing supported AI-enabled features, one or more of the supported AI-enabled features can be implemented such as to optimize wireless connectivity between the UE and the wireless network. For instance, in some implementations utilizing AI features enables signal transmission and processing overhead to be reduced, such as by implementing AI to reduce an amount of control and/or signaling data exchanged between a UE and a wireless network as part of establishing and/or managing wireless connectivity between the UE and the wireless network.

Some implementations of the methods and apparatuses described herein may further include wireless communication at a device (e.g., a UE), which includes generating a capability report configured to specify AI-enabled features of a first node (e.g., a UE) that pertain to at least one protocol layer of a wireless protocol stack; configuring the capability report to indicate that the first node includes AI capability and to specify at least one supported AI feature of the first node including selecting the at least one supported AI feature from available AI features for the capability report; communicating the configured capability report to a second node (e.g., a base station); and engaging in wireless connectivity between the first node and the second node including at least partially implementing the at least one supported AI-enabled feature for wireless connectivity.

In some implementations of the methods and apparatuses described herein, the available AI-enabled features for the capability report include one or more supported AI model types; one or more supported AI model training techniques; one or more supported AI learning frameworks; one or more AI training modes selected from at least an offline training mode, an online training mode, and a mixed training mode; and one or more transceiver application modes selected from at least a joint application mode and an individual block application mode.

Some implementations of the methods and apparatuses described herein may further include wireless communication at a device (e.g., a base station such as a gNB), which includes receiving at a first node (e.g., the base station) a capability report from a second node (e.g., a UE) that specifies one or more supported AI-enabled features of the second node that pertain to at least one protocol layer of a wireless protocol stack; processing the capability report and at least partially implementing at least one AI-enabled feature identified in the capability report; and managing wireless connectivity between the first node and the second node based on the at least partially implementing the at least one supported AI-enabled feature for wireless connectivity.

In some implementations of the method and apparatuses described herein, the available AI features implemented from the capability report include one or more supported AI model types; one or more supported AI model training techniques; one or more supported AI learning frameworks; one or more AI training modes selected from at least an offline training mode, an online training mode, and a mixed training mode; and one or more transceiver application modes selected from at least a joint application mode and an individual block application mode.

BRIEF DESCRIPTION OF THE DRAWINGS

Various aspects of the present disclosure for AI capability reporting for wireless communication are described with reference to the following Figures. The same numbers may be used throughout to reference like features and components shown in the Figures.

FIG. 2 illustrates an example of an AI-enabled notification that supports AI capability reporting for wireless communication in accordance with aspects of the present disclosure.

FIG. 3 illustrates an example of capability reporting for AI-enabled physical (PHY) layer features for wireless communication in accordance with aspects of the present disclosure.

FIG. 4 illustrates an example of AI framework notification that supports AI capability reporting for wireless communication in accordance with aspects of the present disclosure.

FIG. 5 illustrates an example of learning notification that supports AI capability reporting for wireless communication in accordance with aspects of the present disclosure.

FIG. 8 illustrates an example of an application mode notification that supports AI capability reporting for wireless communication in accordance with aspects of the present disclosure.

FIG. 9 illustrates an example of a PHY layer parameters notification that supports AI capability reporting for wireless communication in accordance with aspects of the present disclosure.

FIG. 10 illustrates an example of a channel state indicator-AI sub-feature notification that supports AI capability reporting for wireless communication in accordance with aspects of the present disclosure.

FIG. 11 illustrates an example of a beam management-AI sub-feature notification that supports AI capability reporting for wireless communication in accordance with aspects of the present disclosure.

FIG. 13 illustrates an example of a positioning-AI sub-feature notification that supports AI capability reporting for wireless communication in accordance with aspects of the present disclosure.

DETAILED DESCRIPTION

Figure 1:
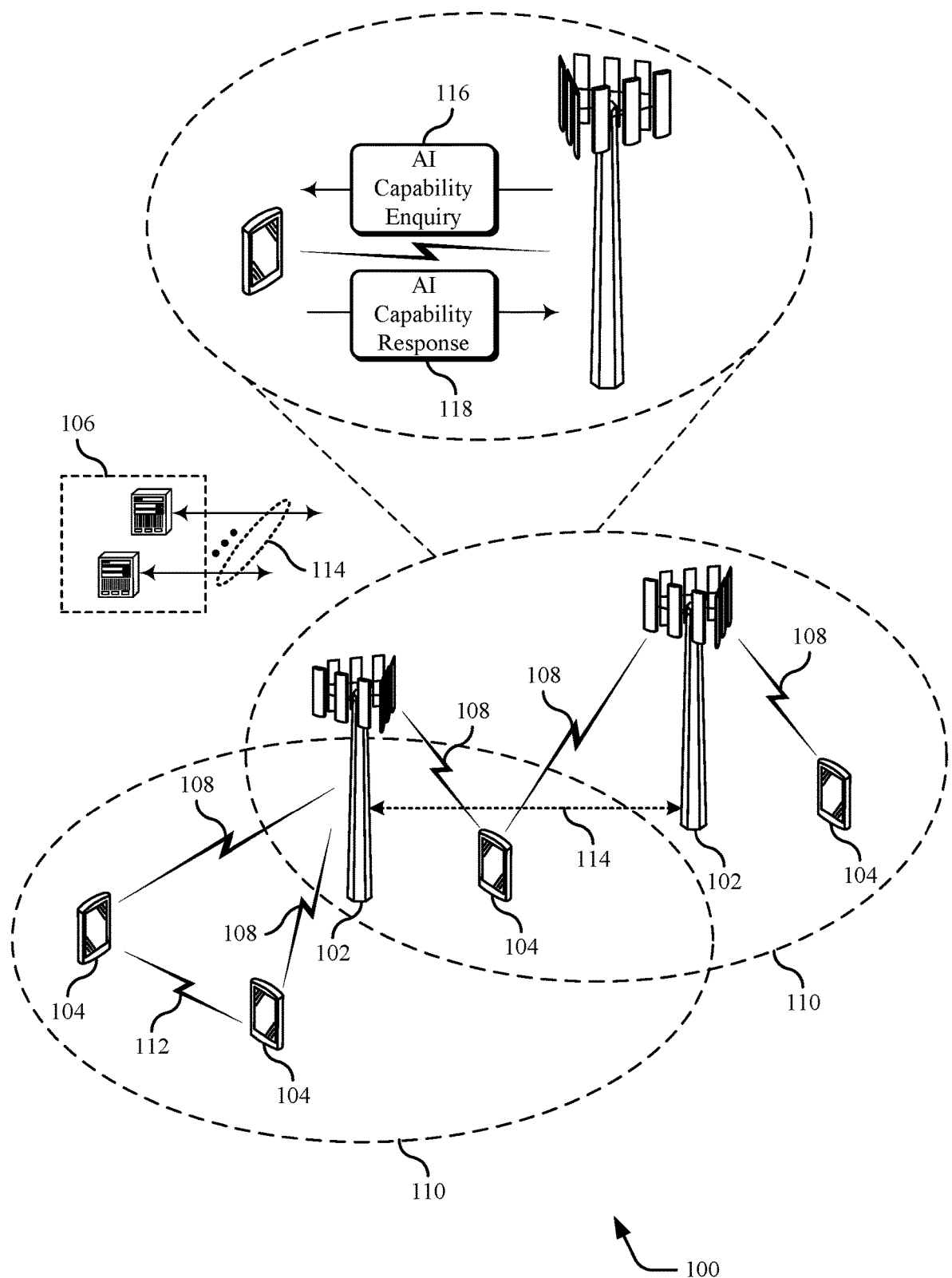
FIG. 1 illustrates an example of a wireless communications system that supports AI capability reporting for wireless communication in accordance with aspects of the present disclosure.

Implementations of AI capability reporting for wireless communication are described, such as related to reporting AI capability information between a UE and a wireless network, e.g., a base station. For instance, by exchanging capability information describing supported AI-enabled features, one or more of the supported AI-enabled features can be implemented such as to optimize wireless connectivity between the UE and the wireless network.

Conventional wireless systems currently have no methods or protocols for enabling AI capability information to be propagated between UEs and other network nodes, such as network base stations. This will prevent AI-enabled features from being utilized for wireless communication between network nodes. For instance, the inability to propagate AI capability information among network nodes exhibited in conventional wireless systems may cause a particular network node or set of network nodes to avoid using AI-related wireless features and thus fail to utilize such features such as for optimizing wireless communication.

Accordingly, to overcome such deficiencies in conventional wireless systems, this disclosure introduces comprehensive techniques for exchanging AI capabilities between network nodes, such as between UEs and network base stations. For instance, different notifications are described that enable a network node to populate the notifications with supported AI capabilities and unsupported AI capabilities. In some implementations a base station communicates a request to a UE for reporting AI capabilities and/or the base station broadcasts an indication (e.g., a broadcast beacon) that the base station supports AI-enabled features functionality and/or specific AI-enabled feature functionality. Accordingly, a UE receives the request and/or detects the broadcast from the base station and generates a capability report that specifies whether the UE supports AI-enabled features and/or specifies specific AI-enabled features supported or not supported by the UE. Supported and non-supported AI features, for instance, can pertain to various layers of a wireless protocol stack such as a PHY layer, medium access control (MAC) protocol layer, radio link control (RLC) protocol layer, radio resource control (RRC) protocol layer, packet data convergence protocol (PDCP) layer, and/or combinations thereof. In at least one implementation where the base station identifies supported and/or not supported AI-enabled features of the base station, the UE generates the capability report to signal AI-enabled features that are also supported by the UE.

The UE transmits the capability report to the base station and the base station processes the capability report to identify supported AI-enabled features and/or non-supported AI-enabled features. In some implementations, where the capability report identifies AI-enabled features supported by the UE, the UE and/or the base station implement one or more of the supported AI-enabled features as part of wireless communication between the UE and the base station. A supported AI-enabled feature can be implemented separately by the UE, implemented separately by the base station, and/or cooperatively between the UE and the base station. For instance, supported AI-enabled features can pertain to signaling optimization between the UE and the base station, such as for signals exchanged as part of channel state information exchange, beam management, channel estimation (CE), UE position determination, and so forth.

Accordingly, by enabling network nodes to share information pertaining to AI capabilities of the nodes, the implementations described in this disclosure enable AI feature capabilities to be propagated among the network nodes. For instance, using the described implementations, various network nodes can quickly and efficiently identify AI-enabled features that are supported and to implement instances of the supported AI-enabled features such as for optimizing various aspects of wireless communication among the nodes.

Aspects of the present disclosure are described in the context of a wireless communications system. Aspects of the present disclosure are further illustrated and described with reference to device diagrams and flowcharts that relate to AI capability reporting for wireless communication.

FIG. 1 illustrates an example of a wireless communications system 100 that supports AI capability reporting for wireless communication in accordance with aspects of the present disclosure. The wireless communications system 100 may include one or more base stations 102, one or more UEs 104, and a core network 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a 5G network, such as an NR network. In other implementations, the wireless communications system 100 may be a combination of a 4G network and a 5G network. The wireless communications system 100 may support radio access technologies beyond 5G. Additionally, the wireless communications system 100 may support technologies, such as time division multiple access (TDMA), frequency division multiple access (FDMA), or code division multiple access (CDMA), etc.

The one or more base stations 102 may be dispersed throughout a geographic region to form the wireless communications system 100. One or more of the base stations 102 described herein may be or include or may be referred to as a base transceiver station, an access point, a NodeB, an eNodeB (eNB), a next-generation NodeB (gNB), a Radio Head (RH), a relay node, an integrated access and backhaul (IAB) node, or other suitable terminology. A base station 102 and a UE 104 may communicate via a communication link 108, which may be a wireless or wired connection. For example, a base station 102 and a UE 104 may perform wireless communication over a Uu interface.

A base station 102 may provide a geographic coverage area 110 for which the base station 102 may support services (e.g., voice, video, packet data, messaging, broadcast, etc.) for one or more UEs 104 within the geographic coverage area 110. For example, a base station 102 and a UE 104 may support wireless communication of signals related to services (e.g., voice, video, packet data, messaging, broadcast, etc.) according to one or multiple radio access technologies. In some implementations, a base station 102 may be moveable, for example, a satellite associated with a non-terrestrial network. In some implementations, different geographic coverage areas 110 associated with the same or different radio access technologies may overlap, but the different geographic coverage areas 110 may be associated with different base stations 102. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region of the wireless communications system 100. A UE 104 may include or may be referred to as a mobile device, a wireless device, a remote device, a handheld device, a customer premise equipment (CPE), or a subscriber device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples. In some implementations, a UE 104 may be stationary in the wireless communications system 100. In some other implementations, a UE 104 may be mobile in the wireless communications system 100.

The one or more UEs 104 may be devices in different forms or having different capabilities. Some examples of UEs 104 are illustrated in FIG. 1. A UE 104 may be capable of communicating with various types of devices, such as the base stations 102, other UEs 104, or network equipment (e.g., the core network 106, a relay device, an integrated access and backhaul (IAB) node, or another network equipment), as shown in FIG. 1. Additionally, or alternatively, a UE 104 may support communication with other base stations 102 or UEs 104, which may act as relays in the wireless communications system 100.

A UE 104 may also be able to support wireless communication directly with other UEs 104 over a communication link 112. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 112 may be referred to as a sidelink. For example, a UE 104 may support wireless communication directly with another UE 104 over a PC5 interface.

A base station 102 may support communications with the core network 106, or with another base station 102, or both. For example, a base station 102 may interface with the core network 106 through one or more backhaul links 114 (e.g., via an S1, N2, N2, or another network interface). The base stations 102 may communicate with each other over the backhaul links 114 (e.g., via an X2, Xn, or another network interface). In some implementations, the base stations 102 may communicate with each other directly (e.g., between the base stations 102). In some other implementations, the base stations 102 may communicate with each other indirectly (e.g., via the core network 106). In some implementations, one or more base stations 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management for the one or more UEs 104 served by the one or more base stations 102 associated with the core network 106.

According to implementations for AI capability reporting for wireless communication, a UE 104 can exchange AI capability information with a particular base station 102. For instance, in the wireless communications system 100, a UE 104 and a base station 102 establish wireless connectivity via a communication link 108, e.g., an RRC_CONNECTED state. Further, the base station 102 communicates an AI capability enquiry 116 to the UE 104 over the communication link 108. The AI capability enquiry 116, for instance, requests AI capability information from the UE 104. Based on the AI capability enquiry 116 the UE 104 generates an AI capability response 118 and communicates the AI capability response 118 to the base station 102 over the communication link 108. The AI capability response 118, for example, indicates whether the UE 104 supports AI functionality and if so, details concerning supported AI functionality. Detailed examples of AI functionality that can be indicated with the AI capability response 118 are presented below. Accordingly, the base station 102 and/or the UE 104 can leverage AI functionality identified in the AI capability response 118 such as to optimize wireless communication between the UE 104 and the base station 102.

As part of setting up wireless connectivity between a UE and a wireless network in conventional wireless systems, UE capability information can be exchanged between the UE and the wireless network. See, for example, 3GPP TS 38.331 (V16.6.0) clause 5.6, which provides an example framework and signaling flow for conventional ways for enabling capability exchange between a UE and a wireless network. For instance, when a UE connects to a base station (RRC_CONNECTED), the base station and the UE undergo access stratum (AS) security activation to enable secure data transfer between the UE and the base station. The base station then transmits a UE capability enquiry (e.g., UECapabilityEnquiry) to the UE and the UE returns a capability response (e.g., UECapabilityInformation) indicating various capabilities of the UE pertaining to wireless communication. The capability response can include various types of UE capabilities pertaining to wireless communication such as supported radio access technologies, supported encryption type(s), supported wireless band combinations, and so forth. Accordingly, utilizing the UE capabilities, the wireless network can configure wireless communication with the UE to comply with capabilities of the UE. Such conventional techniques for exchanging capability information, however, are limited and do not provide ways for identifying AI-related capabilities of a UE or a base station. This prevents a UE and a connected wireless network from leveraging available AI functionality for optimizing wireless connectivity.

This disclosure provides a framework for exchange of AI capability information between a UE 104 and a wireless network (e.g., a base station 102) to enable implementation of AI functionality to improve wireless communications. Reporting of supported AI features can occur in various ways, such as using the described notifications. For instance, a UE 104 can report its AI capability for individual frequency ranges. A UE 104, for example, can indicate that AI capability in frequency range 1 (FR1) is not supported, while AI capability in frequency range 2 (FR2) is supported. Further, in some examples, reporting of AI capability of a UE 104 for certain AI features and/or frequency range is optional, while for other AI features and/or frequency range, reporting of AI capability of a UE 104 can be mandatory. In at least one implementation, whether reporting of AI-enabled features is optional or mandatory can be enforced on a per-cell and/or per-network basis.

In some implementations, a wireless network can request that a UE 104 provide one or more AI capabilities during an initial network access procedure, e.g., before an RRC connection to the wireless network is established. This can allow for a base station 102 of the wireless network and/or a UE 104 to apply AI-enabled procedures at the initial access stage itself, e.g., as part of establishing an RRC_CONNECTED state.

According to one or more implementations, a wireless network can indicate to a UE 104 that it supports AI-enabled features and based on the received indication, the UE 104 can apply the supported AI-enabled features such as AI algorithms, AI procedures, AI signaling, and so forth. A wireless network, for example, indicates its AI capability during the initial access procedures via for example master information block (OB), system information block 1 (SIB1), or other suitable SIB. For instance, network support for AI capability and/or specific AI-enabled features can be broadcast by a base station 102 and received by a UE 104.

In some implementations, implementation of various AI features may be controlled based on permissions. For instance, a UE 104 may initiate a request to a base station 102 of a wireless network requesting whether the UE 104 is allowed to perform certain AI-enabled features. In one implementation, the base station 102 may respond with a positive or negative response for specific AI-enabled features to allow or disallow specific AI features. In at least one implementation, if a base station 102 doesn't respond to the request from a UE 104 for permitted AI features, the UE 104 determines that AI-enabled features are not supported unless the base station 102 communicates some other form of AI feature capability to the UE 104, e.g., other than a response to the request from the UE 104.

According to one or more implementations whether a particular AI-enabled feature is supported or not supported can be implied based on other AI-enabled features that are supported or not supported. For instance, where a particular AI-enabled feature is dependent on and/or a sub-feature of another AI-enabled feature that is indicated as not supported, it can be inferred that the dependent AI feature and/or AI sub-feature is not supported. Further, where a particular AI-enabled feature is a sub-feature of another AI feature that is indicated as supported, it can be inferred that the AI sub-feature is supported. Reporting of specific AI-enabled features can be conditioned on a particular node supporting AI capability. For instance, where a UE 104 indicates that it does not support AI functionality, no further reporting regarding specific AI functionality is requested, e.g., by a base station 102. In some instances, if a UE 104 is not required and/or requested by network to report AI functionality, then further reporting regarding specific AI functionality can be requested by network.

In some implementations various combinations of AI-enabled features can be preconfigured according to a particular AI protocol such that if a particular AI-enabled feature of a particular feature combination is indicated as supported, other AI-enabled features included the feature combination can be inferred as being supported. Additionally or alternatively, if a particular AI-enabled feature of a particular feature combination is indicated as not supported, other AI-enabled features included the feature combination can be inferred as not being supported.

According to one or more implementations, some AI features may be associated with different processing thresholds such as maximum processor latency, maximum processing overhead, minimum processing bandwidth, minimum processor units (e.g., minimum processor cores), minimum processor resources dedicated to AI-enabled features, etc. Accordingly, a UE 104 can report its processing capability to a base station 102 and if the UE 104 does not meet a specified processing threshold for a particular AI feature, the base station 102 can determine that the particular AI feature is not supported by the UE 104. In at least one implementation a UE 104 can report its processing capability that is allocated specifically to AI-enabled functionality and/or to specific AI-enabled features. Further, some AI features may be associated with different memory thresholds such minimum memory bandwidth, minimum data storage capacity, minimum memory dedicated to AI-enabled features, etc. Accordingly, a UE 104 can report its memory capability to a base station 102 and if the UE 104 does not meet a specified memory threshold for a particular AI-enabled feature, the base station 102 can determine that the particular AI-enabled feature is not supported by the UE 104. In at least one implementation a UE 104 can report its memory capability that is allocated specifically to AI-enabled functionality and/or to specific AI-enabled features.

The following discussion presents some example notification types that can be implemented to report AI capability of a UE 104 to a wireless network to enable AI functionality to be implemented, such as to optimize wireless communication between a UE 104 and a wireless network. The described notifications, for example, represent information that can be included in the AI capability response 118 described with reference to the wireless communications system 100. Further, the notifications can be implemented as separate notifications and/or can be combined to generate integrated notifications that describe a variety of different supported and/or not supported AI-enabled features. The described notifications can be implemented in various ways such as information elements, new capability notifications, novel extensions of existing capability notifications, and so forth. Further, the notifications and/or AI features described in the notifications can be combined into instances of capability reports and/or sets of capability reports for reporting AI capabilities. The described notifications are presented for purpose of example only and it is to be appreciated that a variety of different types and forms of notifications can be utilized in accordance with the described and claimed implementations.

In some implementations, a particular node (e.g., a base station 102) can request reporting from another node (e.g., a UE 104) on the various AI-enabled features described in the example notifications below, and/or other instances of AI features not specifically mentioned. Further, a UE 104 can request reporting from a base station 102 on its supported AI features. Alternatively or additionally, a UE 104 can proactively communicate supported and/or not supported AI features to a base station 102, and/or a base station 102 can proactively communicate supported and/or not supported AI features to a UE 104. Further, a particular node can request information concerning specific combinations of the various AI features described in the example notifications below, and/or other instances of AI features not specifically mentioned.

FIG. 2 illustrates an example of an AI-enabled notification 200 that supports AI capability reporting for wireless communication in accordance with aspects of the present disclosure. The AI-enabled notification 200 may implement or be implemented by aspects of the wireless communications system 100. For example, the AI-enabled notification 200 may include an AI supported field 202 that is configurable to indicate whether a particular UE supports AI functionality. For instance, if the AI supported field 202 is configured to indicate "supported," this indicates that a UE has the capability to support AI functionality. If the AI supported field 202 is configured to indicate "notSupported," this indicates that a UE does not support AI functionality. In an example implementation when the AI supported field is indicated as "notSupported," a base station and/or other network node may refrain from enquiring with a UE concerning further AI related capability. However, if the AI supported field is indicated as "supported," a base station and/or other network node may further enquire with a UE concerning details about supported AI capability, such as for AI capabilities concerning supported AI algorithms, supported AI procedures, supported AI signaling, and so forth.

FIG. 3 illustrates an example of a PHY support notification 300 that supports AI capability reporting for wireless communication in accordance with aspects of the present disclosure. The PHY support notification 300 may implement or be implemented by aspects of the wireless communications system 100. The PHY support notification 300 includes a phy-parameters field 302 and a phy-AI-capability field 304. The phy-parameters field 302 is configured to receive identifiers for different PHY layer features of a UE, such as wireless PHY layer features supported by the UE. The phy-AI-capability field 304 is configurable to indicate whether a UE supports AI functionality at the PHY layer ("supported") or does not support AI functionality at the PHY layer ("notSupported"). In some instances, if the UE reports "supported" for phy-AI-capability, then the network may assume that UE is capable of supporting all the AI-enabled PHY layer procedures and signaling. In some other instances, if the UE reports "supported" for phy-AI-capability, then the network may further enquire about specific AI-enabled PHY layer features, if they are supported or not by the UE. On the other hand, if the UE reports "notSupported" for phy-AI-capability, then the network may assume that UE is incapable of supporting all the AI-enabled PHY layer procedures and signaling, and hence the network would not further enquire about specific AI-enabled PHY layer features, and hence the UE would not be expected to receive configuration signaling, or feedback parameters that are related to the aforementioned AI-enabled feature(s).

FIG. 4 illustrates an example of an AI framework notification 400 that supports AI capability reporting for wireless communication in accordance with aspects of the present disclosure. The AI framework notification 400 may implement or be implemented by aspects of the wireless communications system 100. The AI framework notification 400 includes a supported framework field 402 that is configurable to indicate different AI frameworks that are supported or not supported. An AI framework can refer to various model structures and model types of AI algorithms such as neural network architectures, machine learning model (MLM) architectures, combinations of different frameworks, and so forth. While the examples presented in the AI framework notification 400 are indicated in the context of neural network types, it is to be appreciated that a wide variety of different AI frameworks and AI model types can be identified via the AI framework notification 400.

In some implementations, as part of reporting AI framework capability, a maximum supported depth (e.g., number of layers) and a maximum supported width (e.g., number of nodes) that a UE can support for an AI framework is reported. For example, the maximum depth and width of a particular AI framework is reported as a pair of values selected from a codebook of pair values. In another example, each of the maximum supported depth and width supported for a particular AI framework are reported separately.

FIG. 5 illustrates an example of a learning notification 500 that supports AI capability reporting for wireless communication in accordance with aspects of the present disclosure. The learning notification 500 may implement or be implemented by aspects of the wireless communications system 100. The learning notification 500 includes a learning capability field 502 that is configurable to indicate different AI learning (e.g., model training) frameworks that are supported or not supported. For instance, unsupervised learning utilizes unlabeled data sets, while supervised learning utilizes labelled data sets and the desired output is already known at the time of training. Federated learning utilizes training across multiple model nodes that contain local data, but avoids exchange of training data between different nodes. Further, in federated learning parameters obtained from training local models can be used to create a global training mode. Another category of learning is reinforcement learning that is done in absence of a training data set and is based on an agent and a reward until a model being trained converges to a specified training target. These specific examples of learning methods are presented for purpose of example only, and it is to be appreciated that a variety of different learning methods can be implemented in accordance with the described and claimed implementations.

Figure 6:
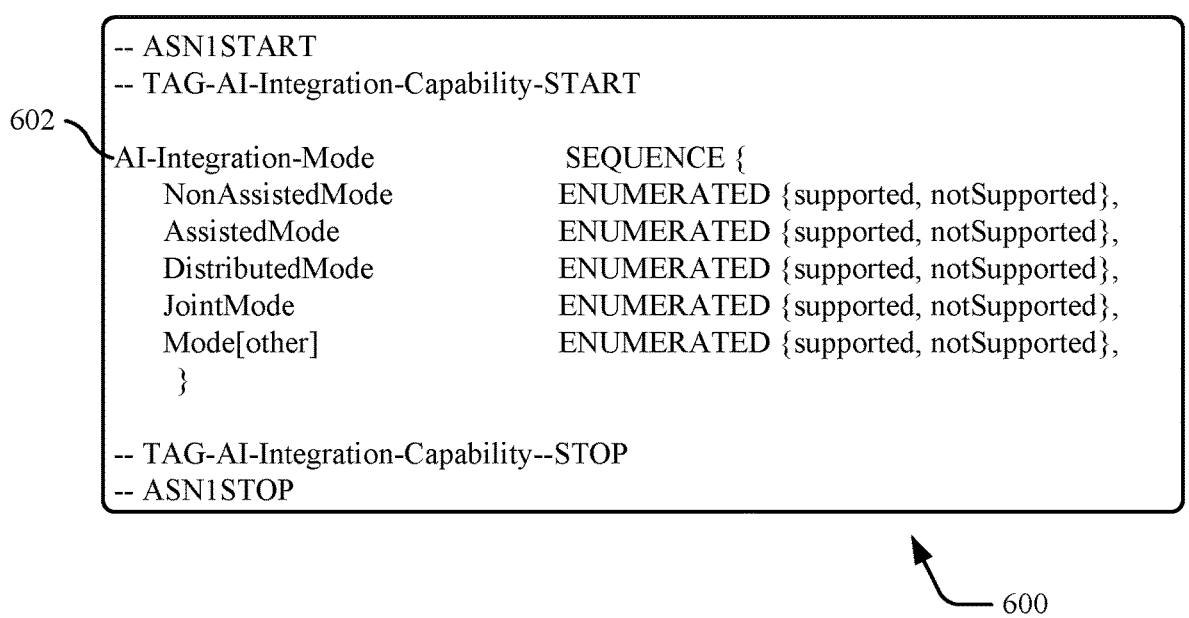
FIG. 6 illustrates an example of an integration mode notification that supports AI capability reporting for wireless communication in accordance with aspects of the present disclosure.

FIG. 6 illustrates an example of an integration mode notification 600 that supports AI capability reporting for wireless communication in accordance with aspects of the present disclosure. The integration mode notification 600 may implement or be implemented by aspects of the wireless communications system 100. The integration mode notification 600 includes an integration mode field 602 that is configurable to indicate different AI integration modes that are supported or not supported. An integration mode refers to how a node such as a UE is capable of integrating AI features. For instance, in a non-assisted mode a node is able to utilize an AI algorithm without assisted signaling from another node such as a base station. In an assisted mode, a node is able to utilize an AI algorithm with assistance from another node such as a base station. In a distributed node, both a transmitter node and a receiver node (e.g., a UE and a base station) can apply AI algorithms independently with or without assisted signaling. Further, in a joint mode, two or more nodes may apply a same AI algorithm for joint application of an AI procedure at both nodes, e.g., at a transmitter node and a receiver node. In some implementations implementing a joint mode involves model transfer between participating nodes. These examples of integration modes are presented for purpose of example, and it is to be appreciated that a variety of different integration modes can be implemented in accordance with the described and claimed implementations. The indication for support of one or more of these modes can also imply which specific AI-enabled feature may or may not be supported by UE and/or network.

Figure 7:
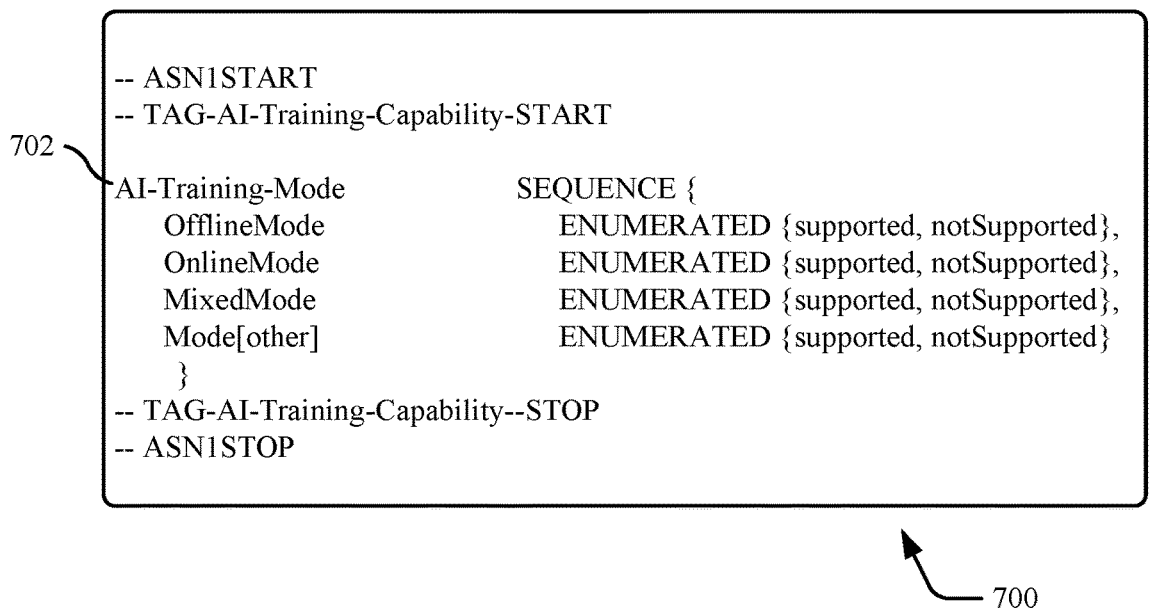
FIG. 7 illustrates an example of a training mode notification that supports AI capability reporting for wireless communication in accordance with aspects of the present disclosure.

FIG. 7 illustrates an example of a training mode notification 700 that supports AI capability reporting for wireless communication in accordance with aspects of the present disclosure. The training mode notification 700 may implement or be implemented by aspects of the wireless communications system 100. The training mode notification 700 includes a training mode field 702 that is configurable to indicate different AI training modes that are supported or not supported. For instance, in an offline mode an AI model implemented by a node is trained prior to node activation, e.g., before the node is deployed and engages in network connectivity. In an online mode, a node causes an AI model to be trained after being deployed, e.g., after node activation. For a mixed mode, an AI model implemented by a node can be partially training in the offline mode, and partially trained in the online mode. These specific examples of training modes are presented for purpose of example only, and it is to be appreciated that a variety of training integration modes can be implemented in accordance with the described and claimed implementations. In some implementations a UE reports its processor and/or memory capabilities pertaining to AI-related training, such as a maximum threshold data size for a training data set and/or a number of model input nodes that processing resources of the UE can support. Thus, if a particular training mode is predicted to exceed the identified processor and/or memory capabilities of a UE, the training mode can be determined to be not supported by the UE.

FIG. 8 illustrates an example of an application mode notification 800 that supports AI capability reporting for wireless communication in accordance with aspects of the present disclosure. The application mode notification 800 may implement or be implemented by aspects of the wireless communications system 100. An application mode, for instance, represents a mode in which an AI model (e.g., algorithm) is applied to radio frequency signal transmitted and/or received by a transceiver, such as to optimize signal quality of transmitted and/or received signal. The application mode notification 800 includes an application mode field 802 that is configurable to indicate different AI application modes that are supported or not supported. One example application mode is an individual mode, where AI is applied to a particular signal block/feature individually in a transceiver chain. For instance, an AI algorithm individually processes one signal block/feature, while the AI algorithm is either not applied to another signal block/feature and/or is individually applied independent of another signal block/feature. In some examples, AI-enabled CE is applied at the UE, but CSI feedback is not processed by AI. In another example, two signal blocks/features are separately/individually processed by AI, for instance, one AI-enabled algorithm is applied for CE and another AI-enabled algorithm is applied for CSI feedback. This can effectively result in applying two separate AI models to signal blocks/features. Another example application mode is a joint mode that represents AI application where block AI application occurs across multiple blocks across a transceiver chain, e.g., in a joint manner. In some examples, a single AI model is applied to optimize both CE and CSI feedback at the UE.

FIG. 9 illustrates an example of a PHY parameters notification 900 that supports AI capability reporting for wireless communication in accordance with aspects of the present disclosure. The PHY parameters notification 900 may implement or be implemented by aspects of the wireless communications system 100. In at least one implementation the phy parameter notification represents an extension of and/or variation on the PHY support notification 300 and identifies specific PHY-level AI functionalities that are supported. The PHY parameters notification 900 includes a PHY parameters field 902 that is configurable to identify different specific PHY-AI parameters that are supported or not supported. In this example the PHY-AI parameters include channel state information (CSI)-AI capabilities. For instance, as part of CSI-AI capabilities a node reports its capability to indicate whether it supports AI-enabled CSI feedback compression. A new type of codebook, for example, can be introduced for AI-enabled CSI codebook compression. In some implementations support of AI-enabled CSI reporting can be introduced and indicated via the CSI-ReportConfig information element. In an additional or alternative implementation, the AI-enabled CSI codebook compression capability can be indicated in a capability information element called CodebookParameters.

Another example PHY-AI parameter is a beam management (BM)-AI parameter that specifies AI-enabled capabilities pertaining to beam management. For instance, as part of BM-AI capabilities a node can report is capability to support AI-enabled beam failure detection and beam recovery. In one implementation, the BeamFailureRecoveryConfig information element can be enhanced to report a node's capability for AI-enabled beam failure and recovery. In some implementations a node can report its capability to support AI-enabled beam indication and prediction. For instance, the TCI-State information element can be enhanced to indicate its capability in terms of Transmission Configuration Indicator (TCI) state prediction, which can be implemented as part of beam prediction. In another example implementation, beam measurements and reporting configuration specific for AI-enabled methods can be indicated and/or reported by a node.

Another example PHY-AI parameter is a channel estimation (CE)-AI parameter that indicates a nodes capability to support AI-enabled CE and/or channel prediction. In some implementations, CE-AI capability can be reported via a node's capability information element and/or can be separately indicated by reporting the node's capability to support a new DeModulation Reference Signal (DMRS) configuration and/or pattern associated with AI-enabled CE and/or channel prediction.

Another example PHY-AI parameter is a positioning (POS)-AI parameter that indicates a nodes capability to support AI-enabled node position determination. For instance, POS-AI capability can be reported in the LocationMeasurementInfo information element. In some implementations an AI-POS capability is indicated for positioning techniques. Alternatively or additionally, positioning technique and/or scenario specific POS capability is reported.

These specific examples of PHY-AI parameters are presented for purpose of example only, and it is to be appreciated that a variety of different PHY-AI parameters can be implemented in accordance with the described and claimed implementations.

FIG. 10 illustrates an example of a CSI-AI sub-feature notification 1000 that supports AI capability reporting for wireless communication in accordance with aspects of the present disclosure. The CSI-AI sub-feature notification 1000 may implement or be implemented by aspects of the wireless communications system 100. In at least one implementation the CSI-AI sub-feature notification 1000 can be implemented in conjunction with the PHY parameters notification 900, such as where the PHY parameters notification 900 indicates that CSI-AI capabilities are supported by a node. The CSI-AI sub-feature notification 1000 includes a CSI-AI sub-feature field 1002 that is configurable to indicate different CSI-AI sub-features that are supported or not supported. For instance, AI-PMIprediction represents AI-assisted precoding matrix indicator prediction; AI-RIprediction represents AI-assisted rank indicator prediction; AI-CQIprediction represents AI-assisted channel quality indicator; AI-Spatial-domainCompression represents AI assisted compression of spatial domain signals; AI-Frequency-domainCompression represents AI-assisted compression of frequency domain signals; and AI-CSI-RScompression represents AI-assisted compression of CSI-reference signals (RS). These specific examples of CSI-AI sub-features are presented for purpose of example only, and it is to be appreciated that a variety of different CSI-AI sub-features can be implemented in accordance with the described and claimed implementations.

CSI-AI sub-features can be communicated in various ways, such as part of a Phy-Parameters information element, as part of a multiple-input and multiple-output (MIMO)-related information element, as part of an information element that is associated with AI capabilities (e.g., the PHY parameters notification 900), as part of an information element associated with CSI-AI-capability (e.g., the CSI-AI sub-feature notification 1000), and so forth.

FIG. 11 illustrates an example of a BM-AI sub-feature notification 1100 that supports AI capability reporting for wireless communication in accordance with aspects of the present disclosure. The BM-AI sub-feature notification 1100 may implement or be implemented by aspects of the wireless communications system 100. In at least one implementation the BM-AI sub-feature notification can be implemented in conjunction with the PHY parameters notification 900, such as where the PHY parameters notification 900 indicates that BM-AI capabilities are supported by a node. The BM-AI sub-feature notification 1100 includes a BM-AI sub-feature field 1102 that is configurable to indicate different BM-AI sub-features that are supported or not supported. For instance, AI-BeamPrediction represents AI-assisted wireless beam prediction; AI-BlockagePrediction represents AI-assisted blockage prediction (e.g. for predicting when signal blockage may occur); AI-SSB compression represents AI-assisted synchronization signal block (SSB) compression; AI-CSI-RScompression represents AI-assisted compression of CSI-reference signals (RS); AI-ReportingCompression represents AI-assisted wireless beam reporting; and AI-BeamFailurePrediction represents AI-assisted prediction of wireless beam failure. These specific examples of BM-AI sub-features are presented for purpose of example only, and it is to be appreciated that a variety of different BM-AI sub-features can be implemented in accordance with the described and claimed implementations.

BM-AI sub-features can be communicated in various ways, such as part of a Phy-Parameters information element, as part of a MIMO-related information element, as part of an information element that is associated with AI capabilities (e.g., the PHY parameters notification 900), as part of an information element associated with BM-AI-capability (e.g., the BM-AI sub-feature notification 1100), and so forth.

Figure 12:
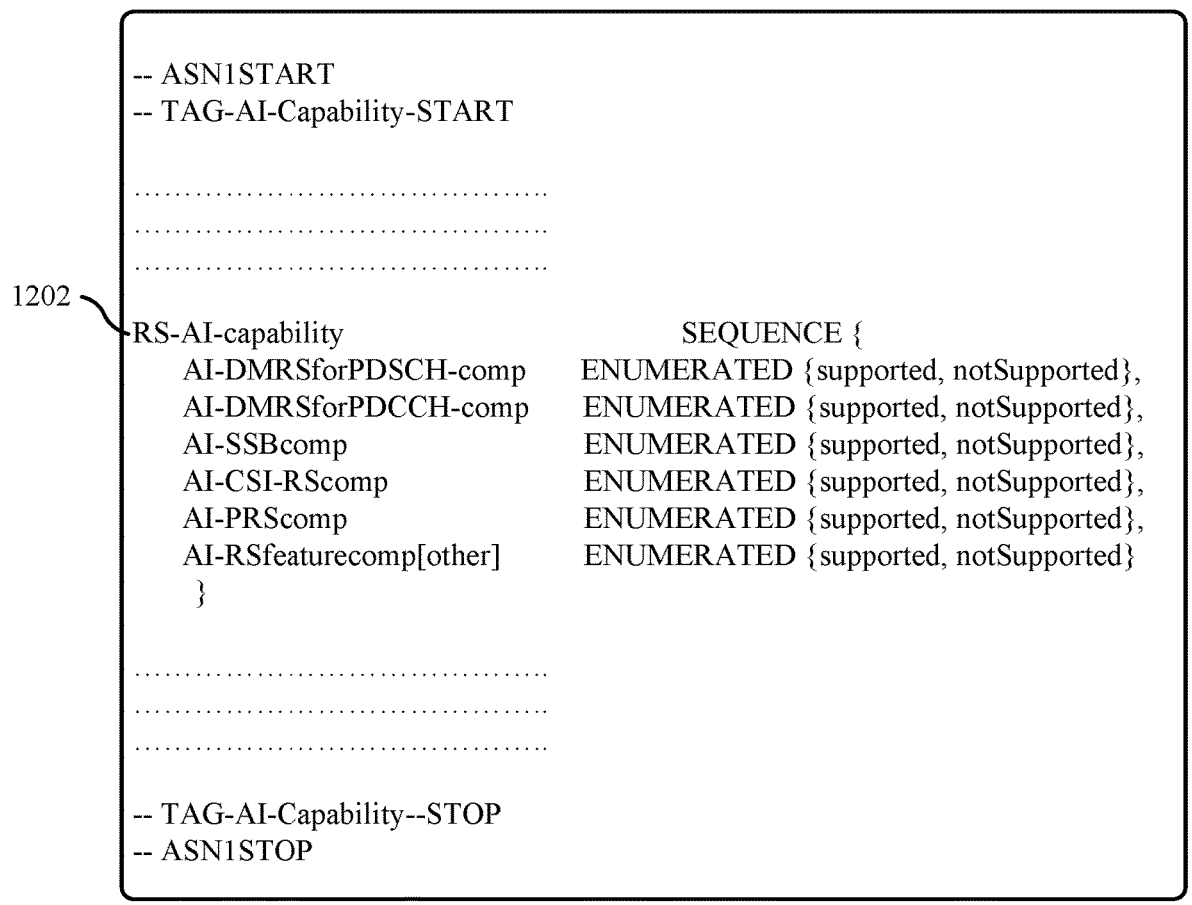
FIG. 12 illustrates an example of a reference signal-AI sub-feature notification that supports AI capability reporting for wireless communication in accordance with aspects of the present disclosure.

FIG. 12 illustrates an example of a RS-AI sub-feature notification 1200 that supports AI capability reporting for wireless communication in accordance with aspects of the present disclosure. The RS-AI sub-feature notification 1200 may implement or be implemented by aspects of the wireless communications system 100. In at least one implementation the RS-AI sub-feature notification can be implemented in conjunction with the CSI-AI sub-feature notification 1000, such as where the CSI-AI sub-feature notification 1000 indicates that AI-assisted compression of CSI-RS are supported by a node. The RS-AI sub-feature notification 1200 includes a RS-AI sub-feature field 1202 that is configurable to indicate different RS-AI sub-features that are supported or not supported. For instance, DMRS-forPDSCH-comp represents AI-assisted compression of DeModulation Reference Signal (DMRS) for Physical Downlink Shared Channel (PDSCH); AI-DMRS-forPDCCH-comp represents AI-assisted compression of DMRS for Physical Downlink Control Channel (PDCCH); AI-SSBcomp represents AI-assisted compression of synchronization signal blocks (SSB); AI-CSI-RScomp represents AI-assisted compression of CSI-RS; and AI-PRScomp represents AI-assisted compression of positioning reference signals. These specific examples of RS-AI sub-features are presented for purpose of example only, and it is to be appreciated that a variety of different RS-AI sub-features can be implemented in accordance with the described and claimed implementations.

RS-AI sub-features can be communicated in various ways, such as part of a Phy-Parameters information element, as part of a MIMO-related information element, as part of an information element that is associated with AI capabilities (e.g., the CSI-AI sub-feature notification 1000 and/or the BM-AI sub-feature notification 1100), as part of an information element associated with RS-AI-capability (e.g., the RS-AI sub-feature notification 1200), and so forth.

FIG. 13 illustrates an example of a POS-AI sub-feature notification 1300 that supports AI capability reporting for wireless communication in accordance with aspects of the present disclosure. The POS-AI sub-feature notification 1300 may implement or be implemented by aspects of the wireless communications system 100. In at least one implementation the POS-AI sub-feature notification can be implemented in conjunction with the PHY parameters notification 900, such as where the PHY parameters notification 900 indicates that a node supports AI-assisted positioning services. The POS-AI sub-feature notification 1300 includes a POS-AI sub-feature field 1302 that is configurable to indicate different POS-AI sub-features that are supported or not supported. For instance, AI-LoSpos-prediction represents AI-assisted position prediction in Line of Sight (LoS) scenarios, AI-NLoSpos-prediction represents AI-assisted position prediction in non-Line of Sight (NLoS) scenarios, and AI-PRScompression represents AI-assisted compression of Positioning Reference Signals (PRS). These specific examples of POS-AI sub-features are presented for purpose of example only, and it is to be appreciated that a variety of different POS-AI sub-features can be implemented in accordance with the described and claimed implementations.

POS-AI sub-features can be communicated in various ways, such as part of a Phy-Parameters information element, as part of a positioning-related information element, as part of an information element that is associated with AI capabilities (e.g., the PHY parameters notification 900), as part of an information element associated with POS-AI-capability (e.g., the POS-AI sub-feature notification 1300), and so forth.

Figure 14:
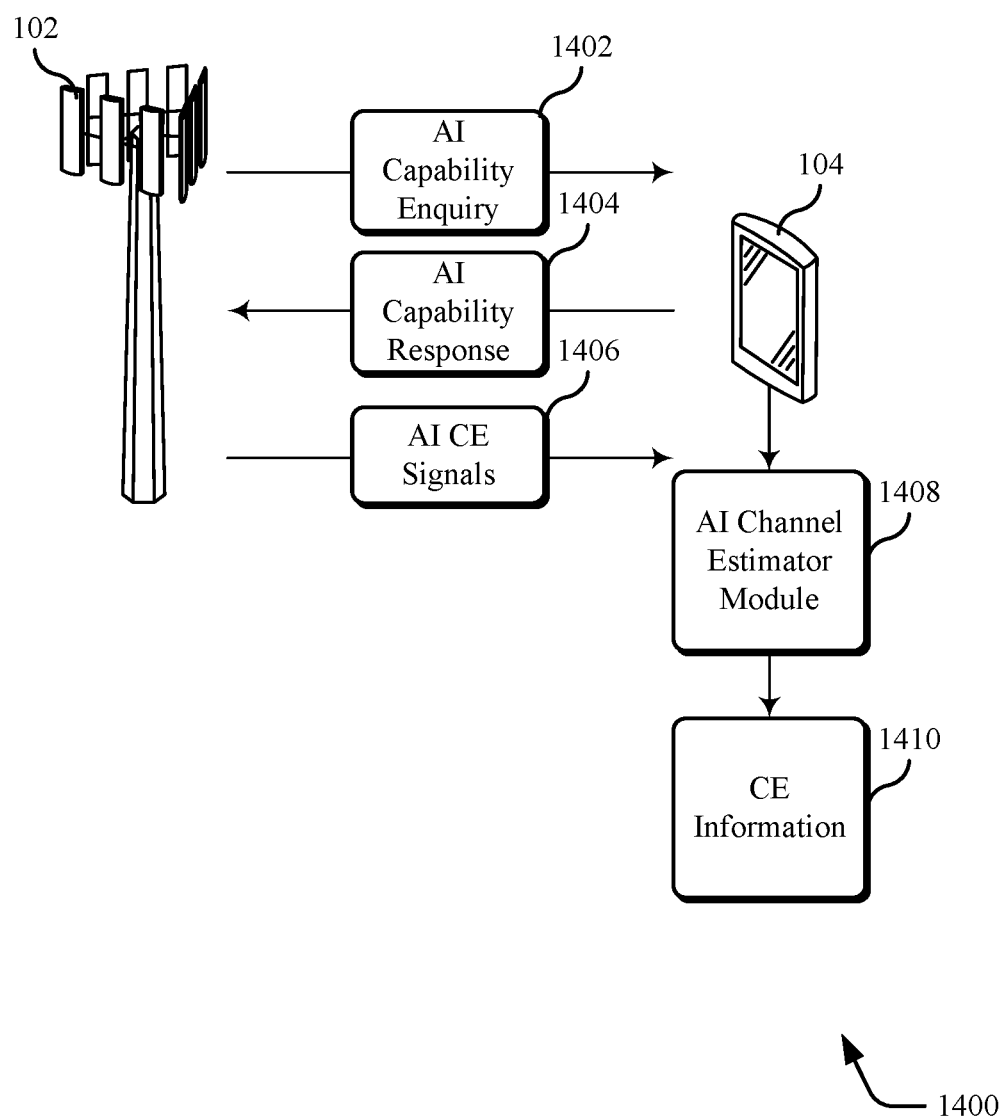
FIG. 14 illustrates an example system that supports AI capability reporting for wireless communication in accordance with aspects of the present disclosure.

FIG. 14 illustrates an example system 1400 for utilizing AI capability reporting for wireless communication in accordance with aspects of the present disclosure. In the system 1400 a base station 102 and a UE 104 intercommunicate to establish a wireless connection. As part of the establishing wireless connectivity, the base station 102 generates an AI capability enquiry 1402 requesting AI capability information and communicates the AI capability enquiry 1402 to the UE 104. Based on the AI capability enquiry 1402 the UE 104 generates an AI capability response 1404 indicating AI capability of the UE 104 and communicates the AI capability response 1404 to the base station 102. The AI capability response 1404 can be formatted in various ways and include various types of information pertaining to AI capability of the UE 104. Examples of different formats and AI-related information types that can be included in the AI capability response 1404 are detailed above.

In the example of FIG. 14 the AI capability response 1404 indicates that the UE 104 supports AI functionality and specific AI functionality including AI-enabled CE. The base station 102 receives the AI capability response 1404 and determines that the UE 104 supports CE-AI capability. Accordingly, based on determining that the UE 104 supports AI capability and specifically CE-AI capability, the base station 102 generates AI-based CE signals 1406 (e.g., DMRS, pilot signals) and transmits the CE signals 1406 for receipt by the UE 104. In some implementations, for example, the base station 102 is configured to transmit a first configuration of CE signals to UEs that that don't support CE-AI functionality, and a second configuration of CE signals to UEs that support CE-AI functionality. The second configuration of CE signals, for instance, includes fewer signals than the first configuration of CE signals. The CE signals 1406, for example, are based on the second configuration of CE signals.

The UE 104 receives the CE signals 1406 and implements an AI channel estimator module 1408 to process the CE signals 1406 and generate CE information 1410. For instance, as part of generating the CE information 1410 the AI channel estimator module 1408 determines channel coefficients and channel noise estimates for a wireless channel over which the AI CE signals 1406 are received. The UE 104 can utilize the CE information 1410 to optimize wireless communication between the UE 104 and the base station 102. Accordingly, the system 1400 illustrates that AI capabilities can be utilized to optimize various aspects of wireless communication. For instance, in this particular example, utilizing CE-AI techniques enables fewer CE-related signals to be exchanged between the base station 102 and the UE 104 as compared with non-AI techniques, thus reducing signal transmission burden on the base station 102 and signal processing burden on the UE 104.

Figure 15:
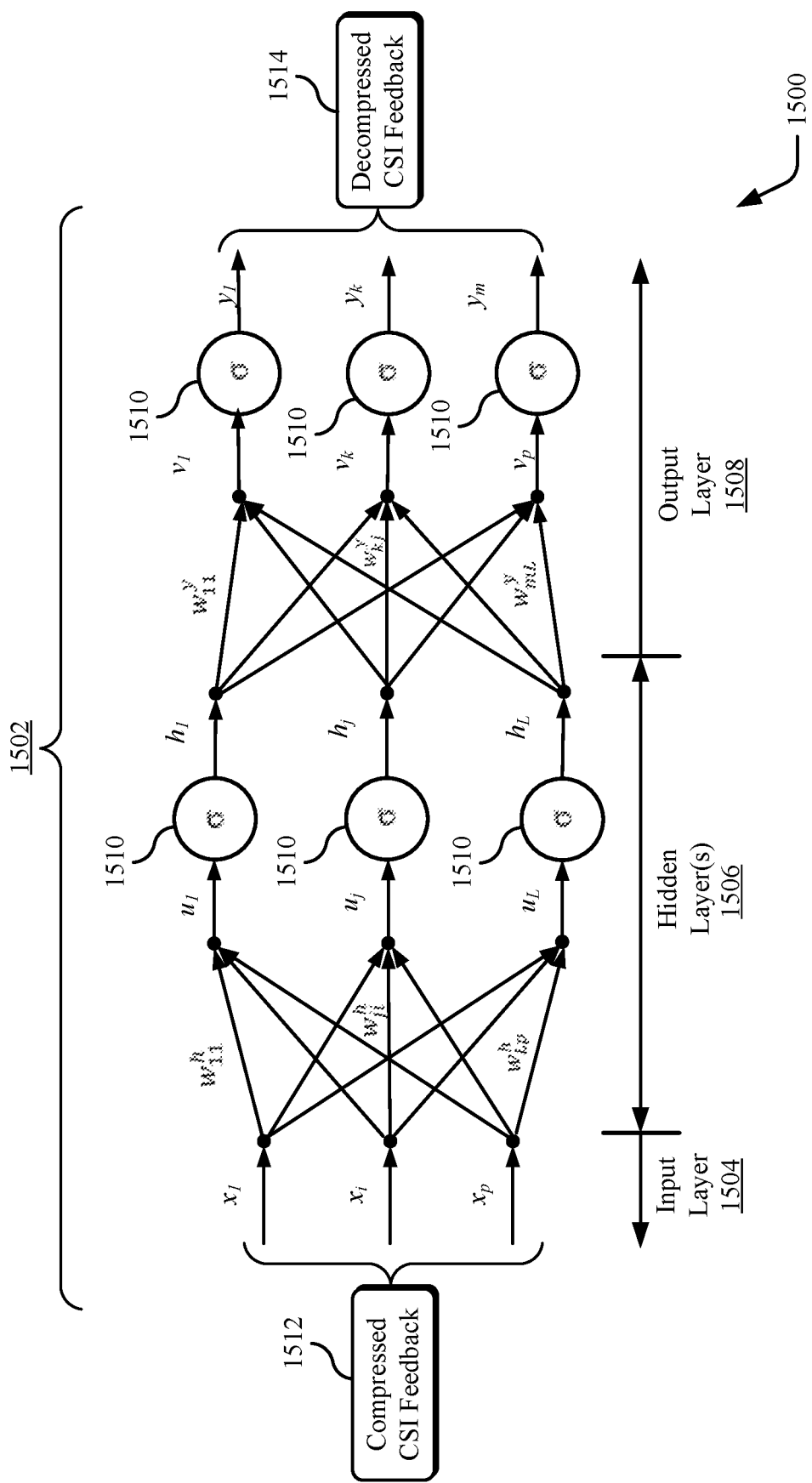
FIG. 15 illustrates an example system that supports AI capability reporting for wireless communication in accordance with aspects of the present disclosure.

FIG. 15 illustrates an example system 1500 for utilizing AI capability reporting for wireless communication in accordance with aspects of the present disclosure. Based on the AI capability reporting discussed within the context of this document, the AI-based CSI decompression or reconstruction is applied at the network based on the CSI related capability information reported by the UE. As illustrated in FIG. 10, a UE can report that AI-based CSI feedback compression is supported. Consequently, the network can assume CSI compression at UE and then correspondingly apply AI-enabled CSI decompression at the network side, as illustrated in FIG. 15. The system 1500 includes an AI model 1502 which in this particular example represents a neural network with an input layer 1504, a hidden layer 1506 (or multiple hidden layers 1506) and an output layer 1508. Further, the hidden layer(s) 1506 include neurons 1510. The AI model 1502 can be utilized to process and predict various types of data pertaining to wireless communication. For instance, in this particular example the AI model 1502 takes compressed CSI feedback 1512 as input (x values), applies weighting values w to the compressed CSI feedback 1512, processes the weighted compressed CSI feedback 1512 at the hidden layer 1506, and generates decompressed CSI feedback 1514 (y values) at the output layer 1508 by predicting the decompressed CSI feedback 1514 from the compressed CSI feedback 1512. In at least one implementation, prior to generating the decompressed CSI feedback 1514 from the compressed CSI feedback, the AI model 1502 is trained utilizing a training data set to enable the AI model to accurately predict decompressed CSI feedback from an input set of compressed CSI feedback.

In addition to utilizing the AI model 1502 for decompression of the compressed CSI feedback 1512, the AI model 1502 and/or other AI model may be leveraged by a UE to generate the compressed CSI feedback 1512 from input CSI feedback. For instance, based on determining that a UE and a base station support AI-enabled CSI compression and decompression, the UE applies AI-enable CSI compression to compress CSI and generate the compressed CSI feedback 1512. The UE then transmits the compressed CSI feedback 1512 to the base station, and the base station applies AI-enabled decompression of the compressed CSI feedback 1512 to generate the decompressed CSI feedback 1514, as described above.

The AI model 1502 can be leveraged in various was for efficient generation of compressed CSI feedback and prediction of decompressed CSI feedback. For instance, the compressed CSI feedback 1512 can be generated by a UE 104 and transmitted to a base station 102 and the base station 102 can leverage the AI model 1502 to generate the decompressed CSI feedback 1514. The base station 102 can utilize the decompressed CSI feedback 1514 to optimize wireless communication between the UE 104 and the base station 102.

Figure 16:
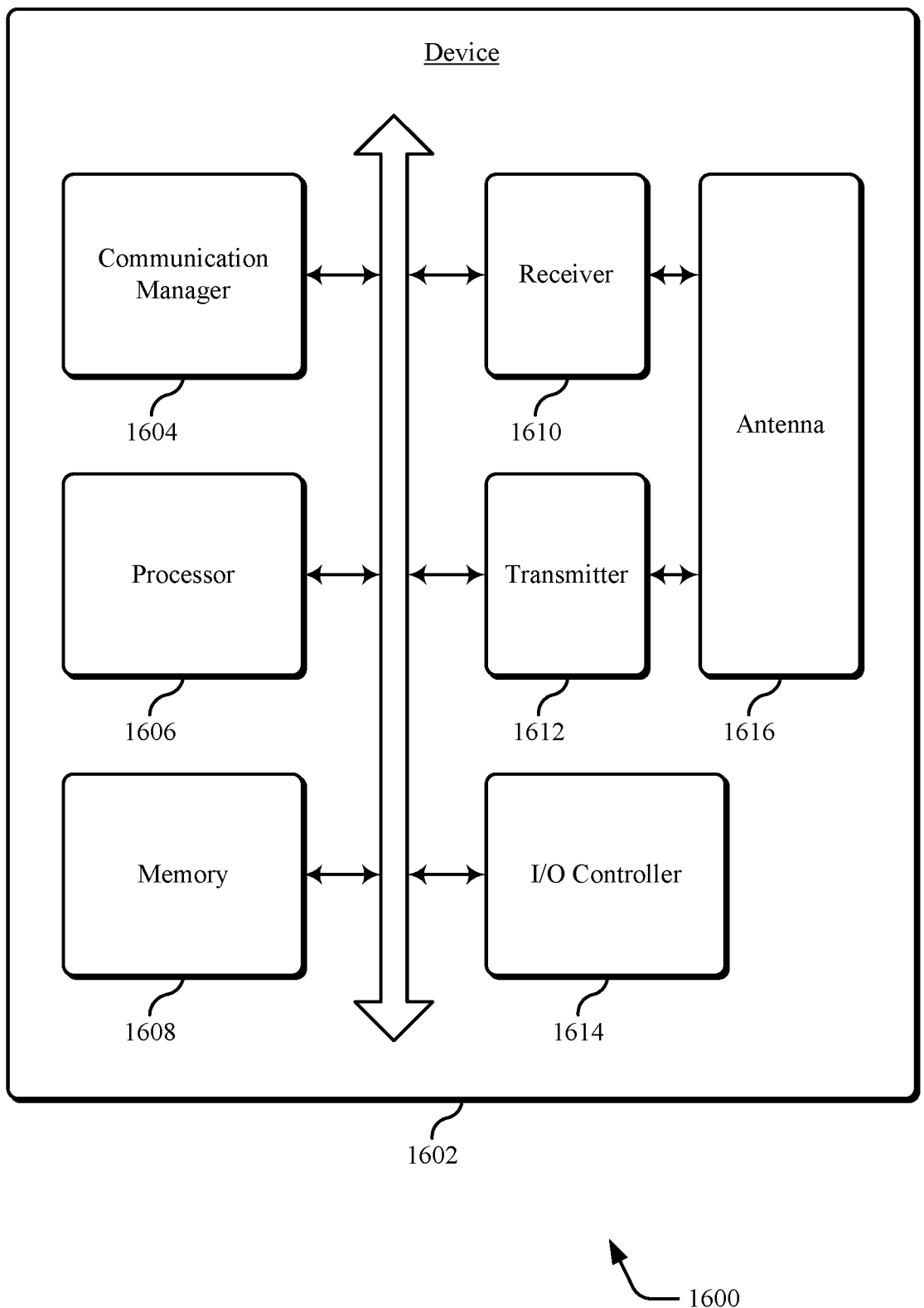
FIG. 16 illustrates an example block diagram of components of a device that supports AI capability reporting for wireless communication in accordance with aspects of the present disclosure.

FIG. 16 illustrates an example of a block diagram 1600 of a device 1602 that supports AI capability reporting for wireless communication in accordance with aspects of the present disclosure. The device 1602 may be an example of a UE 104 as described herein. The device 1602 may support wireless communication with one or more base stations 102, UEs 104, or any combination thereof. The device 1602 may include components for bi-directional communications including components for transmitting and receiving communications, such as a communication manager 1604, a processor 1606, a memory 1608, a receiver 1610, a transmitter 1612, and an I/O controller 1614. These components may be in electronic communication or otherwise coupled (e.g., operatively, communicatively, functionally, electronically, electrically) via one or more interfaces (e.g., buses).

The communication manager 1604, the receiver 1610, the transmitter 1612, or various combinations thereof or various components thereof may be examples of means for performing various aspects of the present disclosure as described herein. For example, the communication manager 1604, the receiver 1610, the transmitter 1612, or various combinations or components thereof may support a method for performing one or more of the functions described herein.

In some implementations, the communication manager 1604, the receiver 1610, the transmitter 1612, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 1606 and the memory 1608 coupled with the processor 1606 may be configured to perform one or more of the functions described herein (e.g., by executing, by the processor 1606, instructions stored in the memory 1608).

Additionally or alternatively, in some implementations, the communication manager 1604, the receiver 1610, the transmitter 1612, or various combinations or components thereof may be implemented in code (e.g., as communications management software or firmware) executed by the processor 1606. If implemented in code executed by the processor 1606, the functions of the communication manager 1604, the receiver 1610, the transmitter 1612, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communication manager 1604 may be configured to perform various operations (e.g., receiving, monitoring, transmitting) using or otherwise in cooperation with the receiver 1610, the transmitter 1612, or both. For example, the communication manager 1604 may receive information from the receiver 1610, send information to the transmitter 1612, or be integrated in combination with the receiver 1610, the transmitter 1612, or both to receive information, transmit information, or perform various other operations as described herein. Although the communication manager 1604 is illustrated as a separate component, in some implementations, one or more functions described with reference to the communication manager 1604 may be supported by or performed by the processor 1606, the memory 1608, or any combination thereof. For example, the memory 1608 may store code, which may include instructions executable by the processor 1606 to cause the device 1602 to perform various aspects of the present disclosure as described herein, or the processor 1606 and the memory 1608 may be otherwise configured to perform or support such operations.

In some implementations, the communication manager 1604 represents and/or implements a dedicated AI module that is configured to apply at least in part the various AI features discussed herein. For instance, to support various AI-features (e.g., algorithms, procedures, signaling, etc.) the communication manager 1604 can be trained or is already trained to accept a set of input parameters and based on the inputs and its trained/learned algorithms provide output for one or more wireless-related procedures, algorithms, signals, and so forth. For instance, AI features implemented by the communication manager 1604 are able to provide output (e.g., via inference) with more highly optimized performance in comparison to a node (e.g., a UE) that does not support AI features. Such performance enabled by supported AI features can be improved in terms of accuracy, latency, overhead, complexity, or combinations thereof. Further, supported basic AI features can be applied at the transmitter 1612, at the receiver 1610, and/or a combination thereof. In some implementations a supported AI feature, unless otherwise indicated, is applicable to both the transmitter chain as well a receiver chain of the device 1602.

For example, the communication manager 1604 may support wireless communication at a first device (e.g., the device 1602) in accordance with examples as disclosed herein. The communication manager 1604 and/or other device components may be configured as or otherwise support a means for wireless communication at a device, including generating a capability report indicating artificial intelligence enabled features of a first node associated with at least one protocol layer of a wireless protocol stack, where the capability report is generated to indicate that the first node includes artificial intelligence capability and to specify at least one supported artificial intelligence enabled feature of the first node including selecting the at least one supported artificial intelligence enabled feature from available artificial intelligence features for the capability report including: one or more supported AI model types; one or more supported AI model training techniques; one or more supported artificial intelligence integration modes; one or more supported AI learning frameworks; one or more AI training modes selected from at least an offline training mode, an online training mode, and a mixed training mode; and one or more transceiver application modes selected from at least a joint application mode and an individual block application mode; communicating the generated capability report to a second node; and engaging in wireless connectivity between the first node and the second node based at least in part on the at least one supported AI feature.

Additionally, wireless communication at the device includes any one or combination of: generating the capability report in response to detection of a broadcast signal from the second node that indicates that the second node supports AI capability; generating the capability report to indicate one or more of processing resources available for AI capability or memory resources available for AI capability; generating the capability report in response to a request from the second node for AI capability of the first node; generating the capability report independent of a request from the second node for AI capability of the first node; receiving a communication from the second node indicating at least one of: that the second node supports AI capability or that the second node supports one or more of the available AI-enabled features for the capability report, and generating the capability report in response to the communication from the second node; where: the one or more supported AI model types are selected from at least a convolutional neural network, a recurrent neural network, a modular neural network, or a combination thereof; the one or more supported AI learning frameworks are selected from at least unsupervised learning, supervised learning, federated learning, reinforced learning, or a combination thereof; and the one or more supported AI integration modes are selected from at least non-assisted mode, assisted mode, distributed mode, joint mode, or a combination thereof; where the available AI features for the capability report correspond to one or more PHY layer procedures in a wireless network, the one or more PHY layer procedures including: channel state information framework, beam management framework, CE AI application framework, reference signal AI application framework, positioning enhancements framework, channel coding or a combination thereof; where one or more of: an available AI feature for the capability report corresponding to the channel state information framework further includes capability sub-features for one or more of PMI prediction, RI prediction, CQI prediction, spatial-domain compression, frequency-domain compression, or CSI-RS compression; an available AI feature for the capability report corresponding to the beam management framework further includes capability sub-features for one or more of beam prediction, blockage prediction, beam failure prediction, SSB compression, CSI-RS compression, or reporting compression; an available AI feature for the capability report corresponding to the reference signal AI application framework further includes capability sub-features for one or more of DMRS-for-PDSCH overhead reduction, DMRS-for-PDCCH overhead reduction, SSB compression, CSI-RS overhead reduction, or PRS overhead reduction; and an available AI feature for the capability report corresponding to the positioning enhancements framework further includes capability sub-features for one or more of line-of-sight positioning prediction, non-line-of-sight positioning prediction, or PRS compression; communicating the generated capability report via one or more of an AI information element or a radio resource control information element; and communicating the generated capability report in response to receiving one or more of a master information block or a system information block; generating the capability report to indicate that the first node supports AI-enabled channel state information compression, and applying an AI model to channel state information to generate compressed channel state information, and transmitting the compressed channel state information for reception by the second node as part of the wireless connectivity between the first node and the second node; generating the capability report to indicate that the first node supports AI-enabled CE; receiving one or more CE signals configured for AI-enabled CE; performing AI-enabled CE utilizing the CE signals configured for AI-enabled CE.

Additionally, a device for wireless communication includes a communication manager configured to: generate a capability report to indicate artificial intelligence enabled features of a first node associated with at least one protocol layer of a wireless protocol stack, where the capability report is generated to indicate that the first node includes artificial intelligence capability and to specify at least one supported artificial intelligence enabled feature of the first node including to select the at least one supported artificial intelligence enabled feature from available artificial intelligence features for the capability report that include: one or more supported AI model types; one or more supported AI model training techniques; one or more supported artificial intelligence integration modes; one or more supported AI learning frameworks; one or more AI training modes selected from at least an offline training mode, an online training mode, and a mixed training mode; and one or more transceiver application modes selected from at least a joint application mode and an individual block application mode; and a transceiver configured to transmit the generated capability report for receipt by a second node, where the communication manager is further configured to engage in wireless connectivity between the first node and the second node based at least in part on the at least one supported AI feature.

Additionally, the device for wireless communication includes any one or combination of: where the communication manager is configured to generate the capability report in response to detection of a broadcast signal from the second node that indicates that the second node supports AI capability; where the communication manager is further configured to generate the capability report to indicate one or more of processing resources available for AI capability or memory resources available for AI capability; where the communication manager is further configured to: generate the capability report in response to a request from the second node for AI capability of the first node; and generate the capability report independent of a request from the second node for AI capability of the first node; where the communication manager is further configured to receive a communication from the second node indicating at least one of: that the second node supports AI capability or that the second node supports one or more of the available AI-enabled features for the capability report, and to generate the capability report in response to the communication from the second node; where: the one or more supported AI model types are selected from at least a convolutional neural network, a recurrent neural network, a modular neural network, or a combination thereof; the one or more supported AI learning frameworks are selected from at least unsupervised learning, supervised learning, federated learning, reinforced learning, or a combination thereof; and the one or more supported AI integration modes are selected from at least non-assisted mode, assisted mode, distributed mode, joint mode, or a combination thereof; where the available AI features for the capability report correspond to one or more PHY layer procedures in a wireless network, the one or more PHY layer procedures including: channel state information framework, beam management framework, CE AI application framework, reference signal AI application framework, positioning enhancements framework, channel coding or a combination thereof; where one or more of: an available AI feature for the capability report corresponding to the channel state information framework further includes capability sub-features for one or more of PMI prediction, RI prediction, CQI prediction, spatial-domain compression, frequency-domain compression, or CSI-RS compression; an available AI feature for the capability report corresponding to the beam management framework further includes capability sub-features for one or more of beam prediction, blockage prediction, beam failure prediction, SSB compression, CSI-RS compression, or reporting compression; an available AI feature for the capability report corresponding to the reference signal AI application framework further includes capability sub-features for one or more of DMRS-for-PDSCH overhead reduction, DMRS-for-PDCCH overhead reduction, SSB compression, CSI-RS overhead reduction, or PRS overhead reduction; and an available AI feature for the capability report corresponding to the positioning enhancements framework further includes capability sub-features for one or more of line-of-sight positioning prediction, non-line-of-sight positioning prediction, or PRS compression; where the communication manager is further configured to: communicate the generated capability report via one or more of an AI information element or a radio resource control information element; and communicate the generated capability report in response to receiving one or more of a master information block or a system information block; where the communication manager is further configured to generate the capability report to indicate that the first node supports AI-enabled channel state information compression, and to apply an AI model to channel state information to generate compressed channel state information, and where the transceiver is further configured to transmit the compressed channel state information for reception by the second node as part of the wireless connectivity between the first node and the second node; where: the communication manager is further configured to generate the capability report to indicate that the first node supports AI-enabled CE; the transceiver is further configured to receive one or more CE signals configured for AI-enabled CE; and the communication manager is further configured to perform AI-enabled CE utilizing the CE signals configured for AI-enabled CE.

The processor 1606 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 1606 may be configured to operate a memory array using a memory controller. In some other implementations, a memory controller may be integrated into the processor 1606. The processor 1606 may be configured to execute computer-readable instructions stored in a memory (e.g., the memory 1608) to cause the device 1602 to perform various functions of the present disclosure.

The memory 1608 may include random access memory (RAM) and read-only memory (ROM). The memory 1608 may store computer-readable, computer-executable code including instructions that, when executed by the processor 1606 cause the device 1602 to perform various functions described herein. The code may be stored in a non-transitory computer-readable medium such as system memory or another type of memory. In some implementations, the code may not be directly executable by the processor 1606 but may cause a computer (e.g., when compiled and executed) to perform functions described herein. In some implementations, the memory 1608 may include, among other things, a basic I/O system (BIOS) which may control basic hardware or software operation such as the interaction with peripheral components or devices.

The I/O controller 1614 may manage input and output signals for the device 1602. The I/O controller 1614 may also manage peripherals not integrated into the device 1602. In some implementations, the I/O controller 1614 may represent a physical connection or port to an external peripheral. In some implementations, the I/O controller 1614 may utilize an operating system such as iOS®, ANDROID®, MS-DOS®, MS-WINDOWS®, OS/2®, UNIX®, LINUX®, or another known operating system. In some implementations, the I/O controller 1614 may be implemented as part of a processor, such as the processor 1606. In some implementations, a user may interact with the device 1602 via the I/O controller 1614 or via hardware components controlled by the I/O controller 1614.

In some implementations, the device 1602 may include a single antenna 1616. However, in some other implementations, the device 1602 may have more than one antenna 1616, which may be capable of concurrently transmitting or receiving multiple wireless transmissions. The receiver 1610 and the transmitter 1612 may communicate bi-directionally, via the one or more antennas 1616, wired, or wireless links as described herein. For example, the receiver 1610 and the transmitter 1612 may represent a wireless transceiver and may communicate bi-directionally with another wireless transceiver. The transceiver may also include a modem to modulate the packets, to provide the modulated packets to one or more antennas 1616 for transmission, and to demodulate packets received from the one or more antennas 1616.

Figure 17:
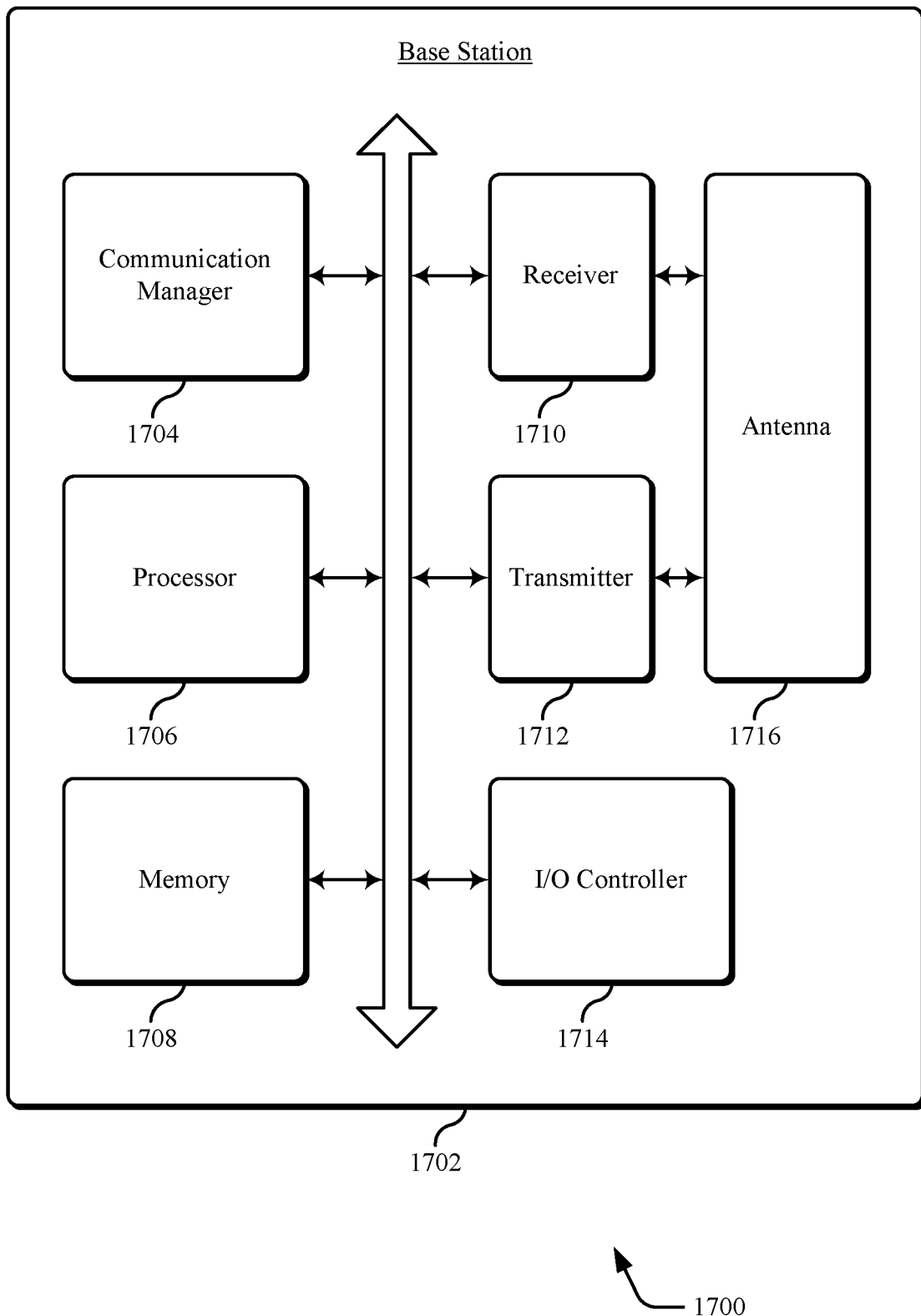
FIG. 17 illustrates an example block diagram of components of a base station that supports AI capability reporting for wireless communication in accordance with aspects of the present disclosure.

FIG. 17 illustrates an example of a block diagram 1700 of a device 1702 that supports AI capability reporting for wireless communication in accordance with aspects of the present disclosure. The device 1702 may be an example of a base station 102, such as a gNB as described herein. The device 1702 may support wireless communication with one or more base stations 102, UEs 104, or any combination thereof. The device 1702 may include components for bi-directional communications including components for transmitting and receiving communications, such as a communications manager 1704, a processor 1706, a memory 1708, a receiver 1710, a transmitter 1712, and an I/O controller 1714. These components may be in electronic communication or otherwise coupled (e.g., operatively, communicatively, functionally, electronically, electrically) via one or more interfaces (e.g., buses).

The communications manager 1704, the receiver 1710, the transmitter 1712, or various combinations thereof or various components thereof may be examples of means for performing various aspects of the present disclosure as described herein. For example, the communications manager 1704, the receiver 1710, the transmitter 1712, or various combinations or components thereof may support a method for performing one or more of the functions described herein.

In some implementations, the communications manager 1704, the receiver 1710, the transmitter 1712, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 1706 and the memory 1708 coupled with the processor 1706 may be configured to perform one or more of the functions described herein (e.g., by executing, by the processor 1706, instructions stored in the memory 1708).

Additionally or alternatively, in some implementations, the communications manager 1704, the receiver 1710, the transmitter 1712, or various combinations or components thereof may be implemented in code (e.g., as communications management software or firmware) executed by the processor 1706. If implemented in code executed by the processor 1706, the functions of the communications manager 1704, the receiver 1710, the transmitter 1712, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communications manager 1704 may be configured to perform various operations (e.g., receiving, monitoring, transmitting) using or otherwise in cooperation with the receiver 1710, the transmitter 1712, or both. For example, the communications manager 1704 may receive information from the receiver 1710, send information to the transmitter 1712, or be integrated in combination with the receiver 1710, the transmitter 1712, or both to receive information, transmit information, or perform various other operations as described herein. Although the communications manager 1704 is illustrated as a separate component, in some implementations, one or more functions described with reference to the communications manager 1704 may be supported by or performed by the processor 1706, the memory 1708, or any combination thereof. For example, the memory 1708 may store code, which may include instructions executable by the processor 1706 to cause the device 1702 to perform various aspects of the present disclosure as described herein, or the processor 1706 and the memory 1708 may be otherwise configured to perform or support such operations.

In some implementations, the communication manager 1704 represents and/or implements a dedicated AI module that is configured to apply at least in part the various AI features discussed herein. For instance, to support various AI-features (e.g., algorithms, procedures, signaling, etc.) the communication manager 1704 can be trained or is already trained to accept a set of input parameters and based on the inputs and its trained/learned algorithms provide output for one or more wireless-related procedures, algorithms, signals, and so forth. For instance, AI features implemented by the communication manager 1704 are able to provide output (e.g., via inference) with more highly optimized performance in comparison to a node (e.g., a base station) that does not support AI features. Such performance enabled by supported AI features can be improved in terms of accuracy, latency, overhead, complexity, or combinations thereof. Further, supported basic AI features can be applied at the transmitter 1712, at the receiver 1710, and/or a combination thereof. In some implementations a supported AI feature, unless otherwise indicated, is applicable to both the transmitter chain as well a receiver chain of the device 1702.

For example, the communications manager 1704 may support wireless communication at a first device (e.g., the base station as device 1702) in accordance with examples as disclosed herein. The communications manager 1704 and/or other device components may be configured as or otherwise support a means for wireless communication at a base station, including receiving a capability report from a second node that indicates one or more supported AI-enabled features of the second node associated with at least one protocol layer of a wireless protocol stack; processing the capability report and to identify at least one AI-enabled feature in the capability report including at least one of: one or more supported AI model types; one or more supported AI model training techniques; one or more supported AI learning frameworks; one or more AI training modes selected from at least an offline training mode, an online training mode, and a mixed training mode; and one or more transceiver application modes selected from at least a joint application mode and an individual block application mode; and managing wireless connectivity between the first node and the second node based at least in part on the at least one supported AI-enabled feature.

Additionally, wireless communication at the base station includes any one or combination of: where the first node includes a base station of a wireless network, and the second node includes a UE; generating a request for AI capability, and transmitting the request for receipt by the second node; generating a further capability report specifying one or more supported AI-enabled features of the first node, and communicating the further capability report for receipt by the second node; generating a further capability report specifying one or more supported AI-enabled features of the first node, and broadcasting the further capability report via a wireless network; processing the capability report to determine that the second node supports AI-enabled CE, and managing wireless connectivity between the first node and the second node includes generating one or more CE signals configured for AI-enabled CE; transmitting the CE signals configured for AI-enabled CE for receipt by the second node; receiving compressed channel state information feedback from the second node; inputting the compressed channel state information feedback to an AI model and receiving decompressed channel state information feedback as output from the AI model.

Additionally, a base station for wireless communication includes a transceiver at a first node configured to receive a capability report from a second node that indicates one or more supported AI-enabled features of the second node associated with at least one protocol layer of a wireless protocol stack; and a communication manager at the first node configured to: process the capability report and to identify at least one AI-enabled feature in the capability report including at least one of: one or more supported AI model types; one or more supported AI model training techniques; one or more supported AI learning frameworks; one or more AI training modes selected from at least an offline training mode, an online training mode, and a mixed training mode; and one or more transceiver application modes selected from at least a joint application mode and an individual block application mode; and manage wireless connectivity between the first node and the second node based at least in part on the at least one supported AI-enabled feature.

Additionally, the base station for wireless communication includes any one or combination of: where the first node includes a base station of a wireless network, and the second node includes a UE; where the communication manager is further configured to generate a request for AI capability, and the transceiver is further implemented to transmit the request for receipt by the second node; where the communication manager is further configured to generate a further capability report specifying one or more supported AI-enabled features of the first node, and the transceiver is further configured to communicate the further capability report for receipt by the second node; where the communication manager is further configured to generate a further capability report specifying one or more supported AI-enabled features of the first node, and the transceiver is further configured to broadcast the further capability report via a wireless network; where: the communication manager is further configured to process the capability report to determine that the second node supports AI-enabled CE, and where to manage wireless connectivity between the first node and the second node includes to generate one or more CE signals configured for AI-enabled CE; and the transceiver is further configured to transmit the CE signals configured for AI-enabled CE for receipt by the second node; where: the transceiver is further configured to receive compressed channel state information feedback from the second node; and the communication manager is further configured to input the compressed channel state information feedback to an AI model and to receive decompressed channel state information feedback as output from the AI model.

The processor 1706 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 1706 may be configured to operate a memory array using a memory controller. In some other implementations, a memory controller may be integrated into the processor 1706. The processor 1706 may be configured to execute computer-readable instructions stored in a memory (e.g., the memory 1708) to cause the device 1702 to perform various functions of the present disclosure.

The memory 1708 may include random access memory (RAM) and read-only memory (ROM). The memory 1708 may store computer-readable, computer-executable code including instructions that, when executed by the processor 1706 cause the device 1702 to perform various functions described herein. The code may be stored in a non-transitory computer-readable medium such as system memory or another type of memory. In some implementations, the code may not be directly executable by the processor 1706 but may cause a computer (e.g., when compiled and executed) to perform functions described herein. In some implementations, the memory 1708 may include, among other things, a basic I/O system (BIOS) which may control basic hardware or software operation such as the interaction with peripheral components or devices.

The I/O controller 1714 may manage input and output signals for the device 1702. The I/O controller 1714 may also manage peripherals not integrated into the device 1702. In some implementations, the I/O controller 1714 may represent a physical connection or port to an external peripheral. In some implementations, the I/O controller 1714 may utilize an operating system such as iOS®, ANDROID®, MS-DOS®, MS-WINDOWS®, OS/2®, UNIX®, LINUX®, or another known operating system. In some implementations, the I/O controller 1714 may be implemented as part of a processor, such as the processor 1706. In some implementations, a user may interact with the device 1702 via the I/O controller 1714 or via hardware components controlled by the I/O controller 1714.

In some implementations, the device 1702 may include a single antenna 1716. However, in some other implementations, the device 1702 may have more than one antenna 1716, which may be capable of concurrently transmitting or receiving multiple wireless transmissions. The receiver 1710 and the transmitter 1712 may communicate bi-directionally, via the one or more antennas 1716, wired, or wireless links as described herein. For example, the receiver 1710 and the transmitter 1712 may represent a wireless transceiver and may communicate bi-directionally with another wireless transceiver. The transceiver may also include a modem to modulate the packets, to provide the modulated packets to one or more antennas 1716 for transmission, and to demodulate packets received from the one or more antennas 1716.

Figure 18:
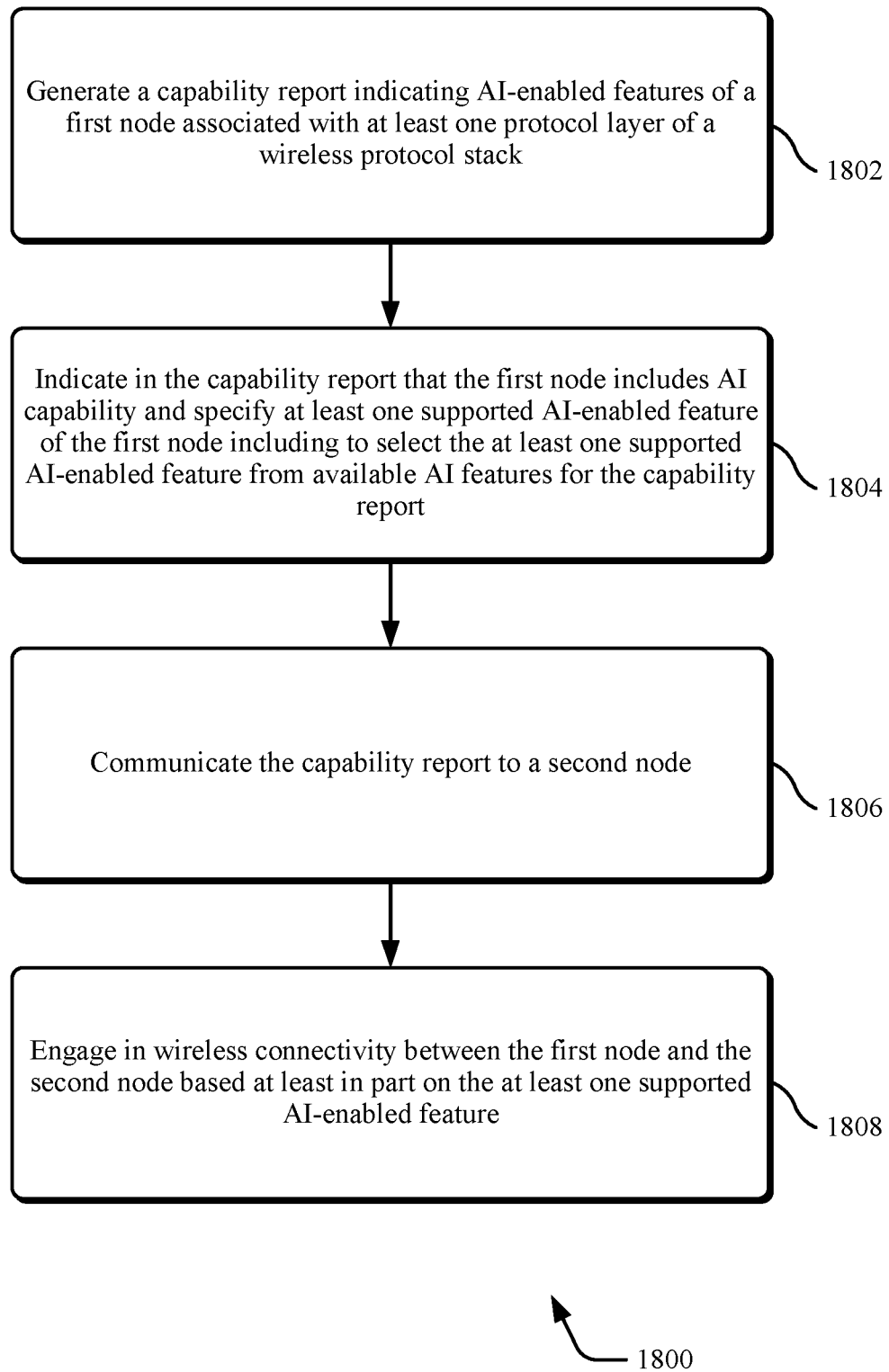
FIGS. 18-22 illustrate flowcharts of methods that support AI capability reporting for wireless communication in accordance with aspects of the present disclosure.

FIG. 18 illustrates a flowchart of a method 1800 that supports AI capability reporting for wireless communication in accordance with aspects of the present disclosure. The operations of the method 1800 may be implemented by a device or its components as described herein. For example, the operations of the method 1800 may be performed by a device, such as a UE 104 as described with reference to FIGS. 1 through 17. In some implementations, the device may execute a set of instructions to control the function elements of the device to perform the described functions. Additionally, or alternatively, the device may perform aspects of the described functions using special-purpose hardware.

At 1802, the method may include generating a capability report indicating AI-enabled features of a first node associated with at least one protocol layer of a wireless protocol stack. The operations of 1802 may be performed in accordance with examples as described herein. In some implementations, aspects of the operations of 1802 may be performed by a device as described with reference to FIG. 1.

At 1804, the method may include indicating in the capability report that the first node includes AI capability and specifying at least one supported AI-enabled feature of the first node including selecting the at least one supported AI-enabled feature from available AI features for the capability report. The operations of 1804 may be performed in accordance with examples as described herein. In some implementations, aspects of the operations of 1804 may be performed by a device as described with reference to FIG. 1. Examples of different AI features that are identifiable in the capability report are detailed above.

At 1806, the method may include communicating the capability report to a second node. The operations of 1806 may be performed in accordance with examples as described herein. In some implementations, aspects of the operations of 1806 may be performed by a device as described with reference to FIG. 1.

At 1808, the method may include engaging in wireless connectivity between the first node and the second node based at least in part on the at least one supported AI-enabled feature. The operations of 1808 may be performed in accordance with examples as described herein. In some implementations, aspects of the operations of 1808 may be performed by a device as described with reference to FIG. 1.

Figure 19:
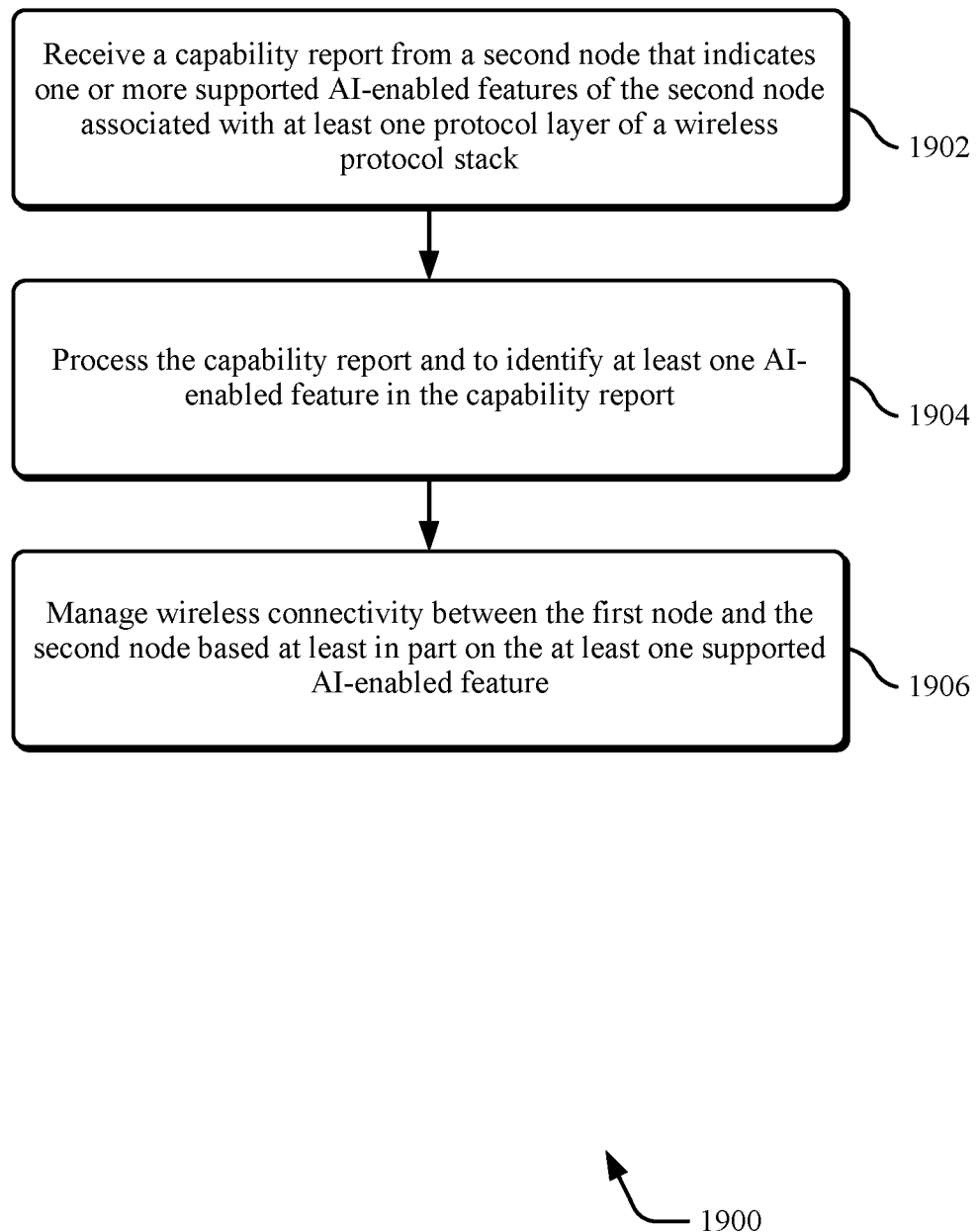

FIG. 19 illustrates a flowchart of a method 1900 that supports AI capability reporting for wireless communication in accordance with aspects of the present disclosure. The operations of the method 1900 may be implemented by a device or its components as described herein. For example, the operations of the method 1900 may be performed by a base station 102, such as a gNB as described with reference to FIGS. 1 through 17. In some implementations, the device may execute a set of instructions to control the function elements of the device to perform the described functions. Additionally, or alternatively, the device may perform aspects of the described functions using special-purpose hardware.

At 1902, the method may include receiving a capability report from a second node that indicates one or more supported AI-enabled features of the second node associated with at least one protocol layer of a wireless protocol stackAI-enabled. The operations of 1902 may be performed in accordance with examples as described herein. In some implementations, aspects of the operations of 1902 may be performed by a device as described with reference to FIG. 1.

At 1904, the method may include processing the capability report and to identify at least one AI-enabled feature in the capability report. The operations of 1904 may be performed in accordance with examples as described herein. In some implementations, aspects of the operations of 1904 may be performed by a device as described with reference to FIG. 1. Examples of different AI features that are identifiable in the capability report are detailed above.

At 1906, the method may include managing wireless connectivity between the first node and the second node based at least in part on the at least one supported AI-enabled feature. The operations of 1906 may be performed in accordance with examples as described herein. In some implementations, aspects of the operations of 1906 may be performed by a device as described with reference to FIG. 1.

Figure 20:
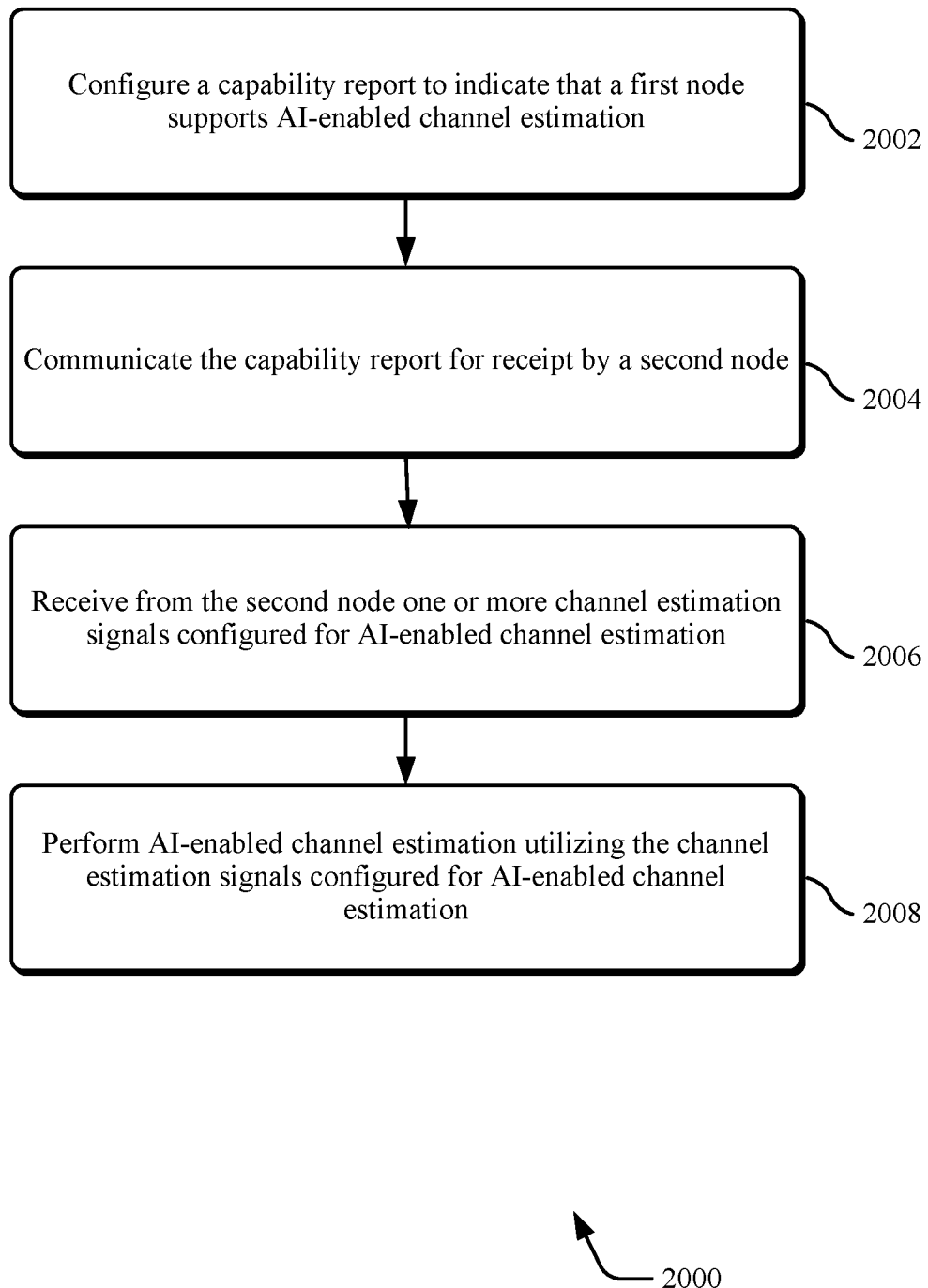

FIG. 20 illustrates a flowchart of a method 2000 that supports AI capability reporting for wireless communication in accordance with aspects of the present disclosure. The operations of the method 2000 may be implemented by a device or its components as described herein. For example, the operations of the method 2000 may be performed by a device, such as a UE 104 as described with reference to FIGS. 1 through 17. In some implementations, the device may execute a set of instructions to control the function elements of the device to perform the described functions. Additionally, or alternatively, the device may perform aspects of the described functions using special-purpose hardware.

At 2002, the method may include configuring a capability report to indicate that a first node supports AI-enabled CE. The operations of 2002 may be performed in accordance with examples as described herein. In some implementations, aspects of the operations of 2002 may be performed by a device as described with reference to FIG. 1.

At 2004, the method may include communicating the capability report for receipt by a second node. The operations of 2004 may be performed in accordance with examples as described herein. In some implementations, aspects of the operations of 2004 may be performed by a device as described with reference to FIG. 1.

At 2006, the method may include receiving from the second node one or more CE signals configured for AI-enabled CE. The operations of 2006 may be performed in accordance with examples as described herein. In some implementations, aspects of the operations of 2006 may be performed by a device as described with reference to FIG. 1.

At 2008, the method may include performing AI-enabled CE utilizing the CE signals configured for AI-enabled CE. The operations of 2008 may be performed in accordance with examples as described herein. In some implementations, aspects of the operations of 2008 may be performed by a device as described with reference to FIG. 1.

Figure 21:
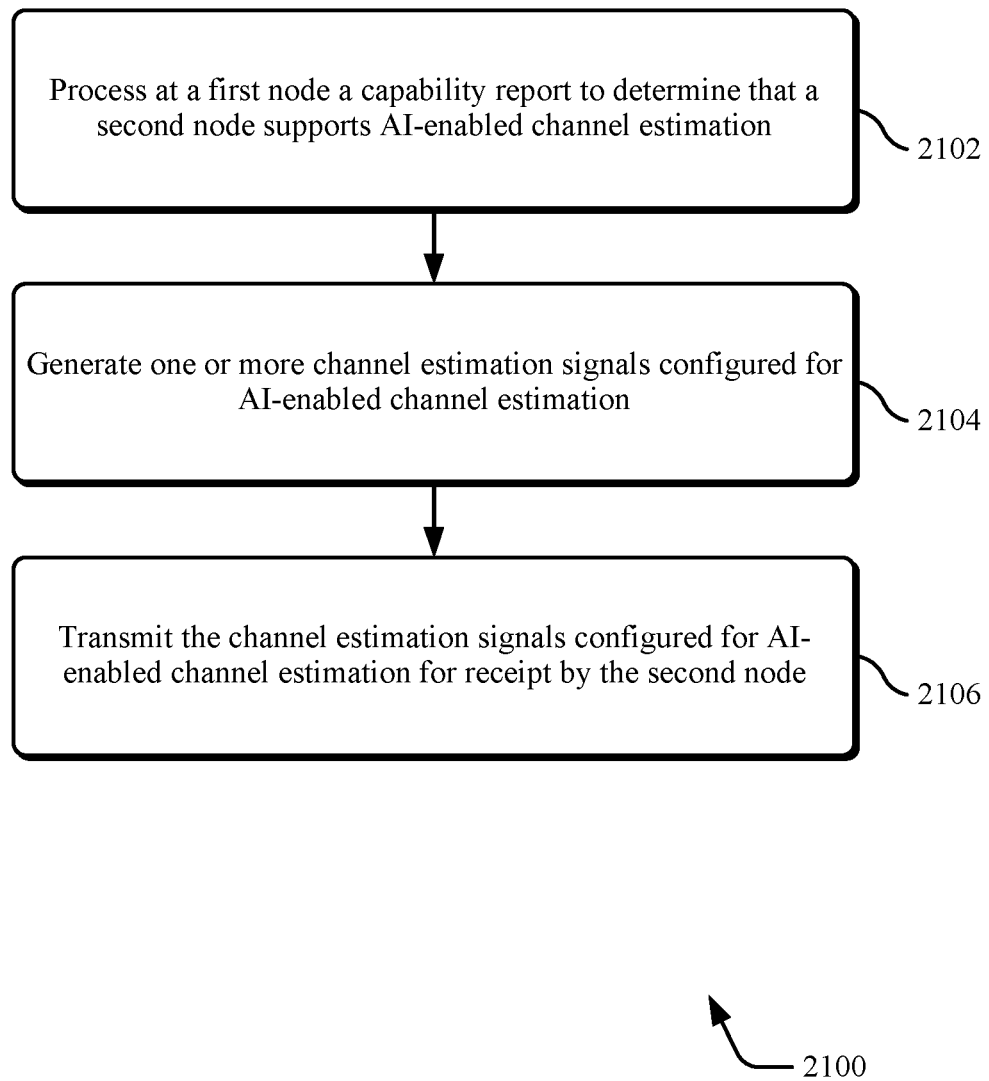

FIG. 21 illustrates a flowchart of a method 2100 that supports AI capability reporting for wireless communication in accordance with aspects of the present disclosure. The operations of the method 2100 may be implemented by a device or its components as described herein. For example, the operations of the method 2100 may be performed by a base station 102, such as a gNB as described with reference to FIGS. 1 through 17. In some implementations, the device may execute a set of instructions to control the function elements of the device to perform the described functions. Additionally, or alternatively, the device may perform aspects of the described functions using special-purpose hardware.

At 2102, the method may include processing at a first node a capability report to determine that a second node supports AI-enabled CE. The operations of 2102 may be performed in accordance with examples as described herein. In some implementations, aspects of the operations of 2102 may be performed by a device as described with reference to FIG. 1.

At 2104, the method may include generating one or more CE signals configured for AI-enabled CE. The operations of 2104 may be performed in accordance with examples as described herein. In some implementations, aspects of the operations of 2104 may be performed by a device as described with reference to FIG. 1.

At 2106, the method may include transmitting the CE signals configured for AI-enabled CE for receipt by the second node. The operations of 2106 may be performed in accordance with examples as described herein. In some implementations, aspects of the operations of 2106 may be performed by a device as described with reference to FIG. 1.

Figure 22:
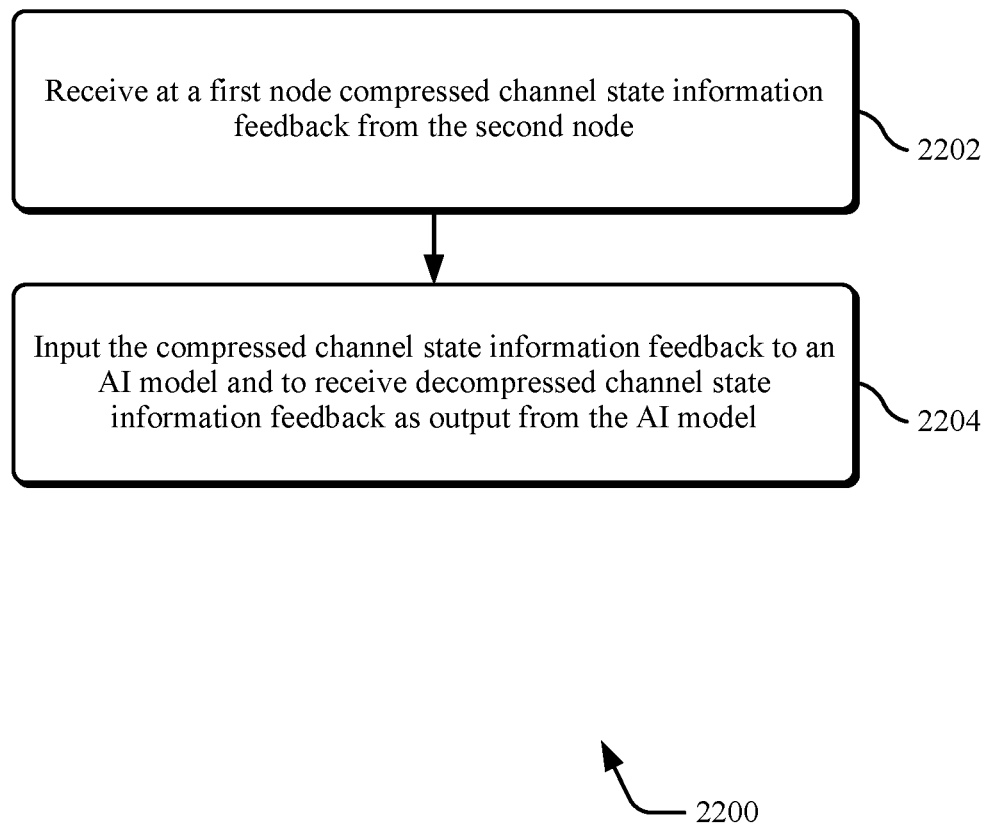

FIG. 22 illustrates a flowchart of a method 2200 that supports AI capability reporting for wireless communication in accordance with aspects of the present disclosure. The operations of the method 2200 may be implemented by a device or its components as described herein. For example, the operations of the method 2200 may be performed by a base station 102, such as a gNB as described with reference to FIGS. 1 through 17. In some implementations, the device may execute a set of instructions to control the function elements of the device to perform the described functions. Additionally, or alternatively, the device may perform aspects of the described functions using special-purpose hardware.

At 2202, the method may include receiving at a first node compressed channel state information feedback from a second node. The operations of 2202 may be performed in accordance with examples as described herein. In some implementations, aspects of the operations of 2202 may be performed by a device as described with reference to FIG. 1.

At 2204, the method may include inputting the compressed channel state information feedback to an AI model and to receive decompressed channel state information feedback as output from the AI model. The operations of 2204 may be performed in accordance with examples as described herein. In some implementations, aspects of the operations of 2204 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined. The order in which the methods are described is not intended to be construed as a limitation, and any number or combination of the described method operations can be performed in any order to perform a method, or an alternate method.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on. Further, as used herein, including in the claims, a "set" may include one or more elements.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first node, comprising:
    at least one memory; and
    at least one processor coupled with the at least one memory and configured to cause the first node to:
        receive, from a second node, signaling comprising at least one of a system information block (SIB) or a master information block (MIB) that indicates that the second node supports an artificial intelligence capability and that indicates one or more artificial intelligence enabled features of the second node;
        generate, responsive to the signaling, a first capability report comprising a first parameter that indicates the first node supports the artificial intelligence capability and a second capability report comprising at least one second parameter that indicates one or more artificial intelligence enabled features of the first node based at least in part on the first parameter indicating that the first node supports the artificial intelligence capability, wherein the one or more artificial intelligence enabled features of the first node and the one or more artificial intelligence enabled features of the second node include at least one of:
            one or more supported artificial intelligence model types;
            one or more supported artificial intelligence model training techniques;
            one or more supported artificial intelligence learning frameworks;
            one or more supported artificial intelligence integration modes;

one or more artificial intelligence training modes selected from at least an offline training mode, an online training mode, and a mixed training mode; or one or more transceiver application modes selected from at least a joint application mode and an individual block application mode;

transmit the first capability report and the second capability report to the second node; and engage in wireless connectivity between the first node and the second node based at least in part on the one or more artificial intelligence enabled features of the first node and the one or more artificial intelligence enabled features of the second node.

2. The apparatus of claim 1, wherein the signaling is a broadcast signal.

3. The apparatus of claim 1, wherein the at least one processor is further configured to cause the first node to generate the second capability report to indicate one or more of processing resources available for the artificial intelligence capability or memory resources available for the artificial intelligence capability.

4. The apparatus of claim 1, wherein the at least one processor is further configured to cause the first node to generate the second capability report based at least in part on a request from the second node for the artificial intelligence capability of the first node.

5. The apparatus of claim 1, wherein:
the one or more supported artificial intelligence model types are selected from at least a convolutional neural network, a recurrent neural network, a modular neural network, or a combination thereof;
the one or more supported artificial intelligence learning frameworks are selected from at least unsupervised learning, supervised learning, federated learning, reinforced learning, or a combination thereof; or
the one or more supported artificial intelligence integration modes are selected from at least non-assisted mode, assisted mode, distributed mode, joint mode, or a combination thereof.

6. The apparatus of claim 1, wherein the at least one or more artificial intelligence enabled features of the first node corresponds to one or more physical layer procedures in a wireless network, the one or more physical layer procedures comprising: channel state information framework, beam management framework, channel estimation artificial intelligence application framework, reference signal artificial intelligence application framework, positioning enhancements framework, channel coding or a combination thereof.

7. The apparatus of claim 6, wherein one or more of:
an available artificial intelligence feature for the second capability report corresponding to the channel state information framework further comprises capability sub-features for one or more of precoding matrix indicator prediction, rank indicator prediction, channel quality indictor prediction, spatial-domain compression, frequency-domain compression, or channel state information reference signal compression;
an available artificial intelligence feature for the second capability report corresponding to the beam management framework further comprises capability sub-features for one or more of beam prediction, blockage prediction, beam failure prediction, synchronization signal block compression, synchronization signal block, or reporting compression;
an available artificial intelligence feature for the second capability report corresponding to the reference signal artificial intelligence application framework further comprises capability sub-features for one or more of demodulation reference signal for physical downlink shared channel overhead reduction, demodulation reference signal for physical downlink control channel overhead reduction, synchronization signal block compression, synchronization signal block overhead reduction, or positioning reference signal overhead reduction; or
an available artificial intelligence feature for the second capability report corresponding to the positioning enhancements framework further comprises capability sub-features for one or more of line-of-sight positioning prediction, non-line-of-sight positioning prediction, or positioning reference signal compression.

8. The apparatus of claim 1, wherein the at least one processor is further configured to cause the first node to communicate the first capability report and the second capability report via one or more of an artificial intelligence information element or a radio resource control information element in response to receiving the signaling.

9. The apparatus of claim 1, wherein the at least one processor is further configured to cause the first node to:
generate the second capability report to indicate that the first node supports artificial intelligence-enabled channel state information compression;
apply an artificial intelligence model to channel state information to generate compressed channel state information; and
transmit the compressed channel state information to the second node as part of the wireless connectivity between the first node and the second node.

10. The apparatus of claim 1, wherein the at least one processor is further configured to cause the first node to:
generate the second capability report to indicate that the first node supports artificial intelligence-enabled channel estimation;
receive one or more channel estimation signals configured for the artificial intelligence-enabled channel estimation; and
perform the artificial intelligence-enabled channel estimation utilizing the one or more channel estimation signals configured for the artificial intelligence-enabled channel estimation.

11. An apparatus for wireless communication at a first node, comprising:
at least one memory; and
at least one processor coupled with the at least one memory and configured to cause the first node to:
transmit, to a second node, signaling comprising at least one of a system information block (SIB) or a master information block (MIB) that indicates that the first node supports an artificial intelligence capability and that indicates one or more artificial intelligence enabled features of the second node;
receive, responsive to the signaling, a first capability report from the second node comprising a first parameter that indicates the second node supports the artificial intelligence capability and a second capability report comprising at least one second parameter that indicates one or more artificial intelligence enabled features of the second node based at least in part on the first parameter indicating that the second node supports the artificial intelligence capability, wherein the one or more artificial intelligence enabled features of the first node and the one or more artificial intelligence enabled features of the second node include at least one of:
one or more supported artificial intelligence model types;
one or more supported artificial intelligence model training techniques;
one or more supported artificial intelligence learning frameworks;
one or more artificial intelligence training modes selected from at least an offline training mode, an online training mode, and a mixed training mode; or
one or more transceiver application modes selected from at least a joint application mode and an individual block application mode; and
manage wireless connectivity between the first node and the second node based at least in part on the one or more artificial intelligence enabled features of the first node and the one or more artificial intelligence enabled features of the second node.

12. The apparatus of claim 11, wherein the first node comprises a base station of a wireless network, and the second node comprises a user equipment.

13. The apparatus of claim 11, wherein the at least one processor is further configured to cause the first node to:
generate a request for the second capability report based at least in part on receiving the first capability report; and
transmit the request to the second node.

14. The apparatus of claim 11, wherein the at least one processor is further configured to cause the first node to:
generate a third capability report indicating the one or more artificial intelligence enabled features of the first node; and
communicate the third capability report for receipt by the second node.

15. The apparatus of claim 11, wherein the at least one processor is further configured to cause the first node to broadcast the signaling via a wireless network.

16. The apparatus of claim 11, wherein the at least one processor is further configured to cause the first node to:
process the second capability report to determine that the second node supports artificial intelligence-enabled channel estimation, and wherein to manage the wireless connectivity between the first node and the second node includes to generate one or more channel estimation signals configured for the artificial intelligence-enabled channel estimation; and
transmit the one or more channel estimation signals configured for the artificial intelligence-enabled channel estimation to the second node.

17. The apparatus of claim 11, wherein the at least one processor is further configured to cause the first node to:
receive compressed channel state information feedback from the second node; and
input the compressed channel state information feedback to an artificial intelligence model and to receive decompressed channel state information feedback as output from the artificial intelligence model.

18. A method for wireless communication at a first node, the method comprising:
receiving, from a second node, signaling comprising at least one of a system information block (SIB) or a master information block (MIB) that indicates that the second node supports an artificial intelligence capability and that indicates one or more artificial intelligence enabled features of the second node;
generating, responsive to the signaling, a first capability report comprising a first parameter that indicates the first node supports the artificial intelligence capability and a second capability report comprising at least one second parameter that indicates one or more artificial intelligence enabled features of the first node based at least in part on the first parameter indicating that the first node supports the artificial intelligence capability, wherein the one or more artificial intelligence enabled features of the first node and the one or more artificial intelligence enabled features of the second node include at least one of:
one or more supported artificial intelligence model types;
one or more supported artificial intelligence model training techniques;
one or more supported artificial intelligence learning frameworks;
one or more supported artificial intelligence integration modes;
one or more artificial intelligence training modes selected from at least an offline training mode, an online training mode, and a mixed training mode; or
one or more transceiver application modes selected from at least a joint application mode and an individual block application mode, or a combination thereof;
transmitting the first capability report and the second capability report to the second node; and
engaging in wireless connectivity between the first node and the second node based at least in part on the one or more artificial intelligence enabled features of the first node and the one or more artificial intelligence enabled features of the second node.

19. The method of claim 18, further comprising determining the one or more artificial intelligence enabled features of the first node based at least in part on one or more of a data processing capability of the first node or a memory capability of the first node.

20. A processor for wireless communication, comprising:
at least one controller coupled with at least one memory and configured to cause the processor to:
receive, from a node, signaling comprising at least one of a system information block (SIB) or a master information block (MIB) that indicates that the node supports an artificial intelligence capability and that indicates one or more artificial intelligence enabled features of the node;
generate, responsive to the signaling, a first capability report comprising a first parameter that indicates the processor supports the artificial intelligence capability and a second capability report comprising at least one second parameter that indicates one or more artificial intelligence enabled features of the processor based at least in part on the first parameter indicating that the processor supports the artificial intelligence capability, wherein the one or more artificial intelligence enabled features of the processor and the one or more artificial intelligence enabled features of the node include at least one of:
one or more supported artificial intelligence model types;
one or more supported artificial intelligence model training techniques;
one or more supported artificial intelligence learning frameworks;

one or more supported artificial intelligence integration modes;
one or more artificial intelligence training modes selected from at least an offline training mode, an online training mode, and a mixed training mode; or
one or more transceiver application modes selected from at least a joint application mode and an individual block application mode;

transmit the first capability report and the second capability report to the node; and engage in wireless connectivity between the processor and the node based at least in part on the one or more artificial intelligence enabled features of the processor and the one or more artificial intelligence enabled features of the node.

* * * * *